United States Patent
Okazaki et al.

(10) Patent No.: US 10,951,092 B2
(45) Date of Patent: Mar. 16, 2021

(54) TRANSPORT SYSTEM, CARRIAGE, POSITIONING APPARATUS, PROCESSING SYSTEM, AND POSITIONING METHOD

(71) Applicant: CANON KABUSHIKI KAISHA, Tokyo (JP)

(72) Inventors: Ryota Okazaki, Yamato (JP); Kichinosuke Hirokawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 15/982,386

(22) Filed: May 17, 2018

(65) Prior Publication Data

US 2018/0337577 A1 Nov. 22, 2018

(30) Foreign Application Priority Data

May 19, 2017 (JP) .............................. JP2017-099818

(51) Int. Cl.

| H02K 41/02 | (2006.01) |
|---|---|
| H02K 7/14 | (2006.01) |
| B23P 19/04 | (2006.01) |
| H02K 33/02 | (2006.01) |
| B23P 21/00 | (2006.01) |
| B23P 19/00 | (2006.01) |
| B65G 47/88 | (2006.01) |

(52) U.S. Cl.
CPC .............. *H02K 7/14* (2013.01); *B23P 19/001* (2013.01); *B23P 19/04* (2013.01); *B23P 21/004* (2013.01); *B65G 47/8838* (2013.01); *H02K 33/02* (2013.01); *H02K 41/02* (2013.01)

(58) Field of Classification Search
CPC ....... B23P 19/04; B23P 19/001; B23P 21/004; H02K 33/02; H02K 41/02; H02K 7/14; B65G 47/8838
See application file for complete search history.

(56) References Cited

U.S. PATENT DOCUMENTS

| 3,934,183 A | * | 1/1976 | Saufferer | ............ | H02K 41/025 |
|---|---|---|---|---|---|
| | | | | | 318/135 |
| 4,800,818 A | * | 1/1989 | Kawaguchi | .......... | B23Q 7/1436 |
| | | | | | 104/290 |
| 2014/0331888 A1* | | 11/2014 | Wernersbach | ........ | B60L 13/006 |
| | | | | | 104/282 |

FOREIGN PATENT DOCUMENTS

| EP | 0010131 A1 | * | 4/1980 | ........... B23Q 7/1473 |
|---|---|---|---|---|
| JP | 2003145362 A | | 5/2003 | |
| JP | 4014183 B | | 11/2007 | |

* cited by examiner

*Primary Examiner* — Naishadh N Desai
(74) *Attorney, Agent, or Firm* — Venable LLP

(57) ABSTRACT

A carriage on which a workpiece is supplied and which is transported by a transport path has a reference member that is a reference for positioning of the workpiece. The carriage also has a fixing unit, whose motion is controlled by a control unit provided outside the carriage, that fixes the workpiece. The workpiece, which has been positioned in a first direction on the carriage and has not yet been fixed by the fixing unit, is pressed in a second direction against the reference member by a positioning unit, in which the second direction intersects with the first direction, and the workpiece is positioned on the carriage in the second direction.

18 Claims, 13 Drawing Sheets

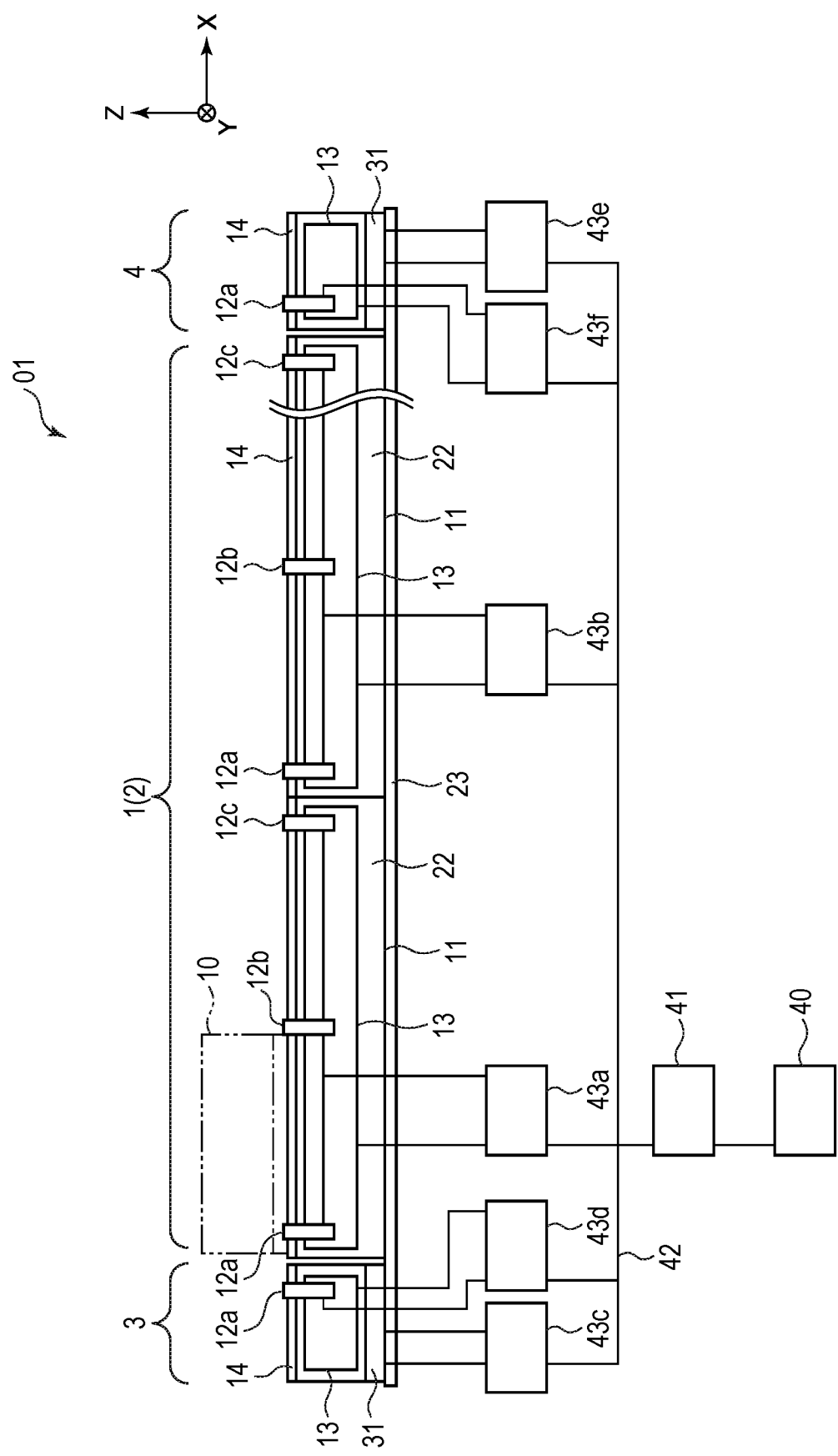

TRANSPORT SYSTEM, CARRIAGE, POSITIONING APPARATUS, PROCESSING SYSTEM, AND POSITIONING METHOD

BACKGROUND OF THE INVENTION

Field of the Invention

The present invention relates to a transport system that transports a work; a carriage and a positioning apparatus used in the transport system; a processing system having the transport system; and a work positioning method.

Description of the Related Art

In a processing system having a transport device of a work, a plurality of operation apparatuses that perform predetermined working processes are installed at predetermined intervals, and work transport apparatuses are each arranged between these working processes. Further, after predetermined processing is applied to works at each working process, the works are successively transported to the subsequent working process by the transport apparatus.

In a processing system, in order to apply precision processing such as assembly of components in each working process, it is necessary to position a work at a predetermined position in advance. Thus, in the conventional processing system, work positioning apparatuses are installed for respective working processes, and a work is passed from the transport apparatus and then the work is positioned by the positioning apparatus.

Further, as a work positioning method, a contact positioning scheme is widely known. The contact positioning scheme is to provide a contact reference component for a work on a positioning apparatus and position the work by using actuating means such as a spring to cause a contact reference of the work to come into contact with the contact reference component.

When a work is passed from the transport apparatus to the positioning apparatus and the work is positioned for each working process as described above, there is a concern of dead time caused by the time required for passing and the time required for positioning. Furthermore, there is a concern of a flaw in a work caused by multiple times of repetition of work handling.

Thus, in some cases, a work on a transport carriage is directly processed without the work being passed to the positioning apparatus. In this case, however, with a plurality of pushers and actuators for pusher operations being mounted on the transport carriage, there is a problem of increased size and complexity of the transport carriage. Further, in this case, it is necessary to perform a transport operation and various processing operations while holding the position of the work positioned on the transport carriage. Thus, while it is necessary to firmly fix a work on the transport carriage, this requires larger pushing force of a pusher, which results in a concern that a flaw or the like is caused in the work when positioned.

Further, with the actuator for a pusher operation being provided on the transport carriage, this leads to a problem of a limited operation area of the transport carriage due to cables, pipes, or the like used for transmitting motive power to the actuator.

To address the above-described problems, Japanese Patent No. 4014183 discloses an art that enables positioning in two directions orthogonal to each other by an operation of a single actuator using a cam plate and a plurality of links.

Further, Japanese Patent Application Laid-Open No. 2003-145362 discloses an art that provides drive means for a work positioning clamp on the side of the work removal position of an assembly line without providing a carriage and actuates the positioning clamp by using the drive means.

However, the art disclosed in Japanese Patent No. 4014183 has to mount at least one actuator on a transport carriage. Thus, in the art disclosed in Japanese Patent No. 4014183, there are problems of increased size and complexity of the transport carriage and a limited movable area of the transport carriage.

Further, in the art disclosed in Japanese Patent Application Laid-Open No. 2003-145362, a positioning guide member is inserted in a clamp hole formed in a work and thereby the work is positioned. Thus, in Japanese Patent Application Laid-Open No. 2003-145362, there are problems that, because a clamp hole is required to be formed in a work, a processed work is limited to a work in which a clamp hole can be formed, and that the positioning accuracy is lower than that in the contact positioning scheme.

SUMMARY OF THE INVENTION

The object of the present invention is to provide a transport system, a carriage, a positioning apparatus, and a positioning method that can realize accurate and stable positioning of a work on the carriage and realize a reduction in weight and a reduction in size of the carriage.

Further, another object of the present invention is to provide a processing system using the above-described transport system.

According to one aspect of the present invention, provided is a transport system including: a carriage on which a work is supplied; a transport path that transports the carriage; and a positioning apparatus that positions the work on the carriage. The carriage has a reference member that is a reference for positioning of the work and a fixing unit that fixes the work on the carriage, and the positioning apparatus has a positioning unit that presses the work, which has been positioned in a first direction on the carriage and has not yet been fixed by the fixing unit, in a second direction against the reference member to position the work in the second direction on the carriage, in which the second direction intersects with the first direction. The transport system further includes a control unit that is provided outside the carriage and controls motion of the fixing unit.

According to another aspect of the present invention, provided is a carriage on which a work is supplied and which is transported on a transport path. The carriage includes: a reference member that is a reference for positioning of the work; and a fixing unit whose motion is controlled by a control unit provided outside the carriage and that fixes the work. The work that has been positioned in a first direction on the carriage and has not yet been fixed by the fixing unit is pressed in a second direction against the reference member by a positioning unit, and the work is positioned on the carriage in the second direction, in which the second direction intersects with the first direction.

According to yet another aspect of the present invention, provided is a positioning apparatus used in a transport system having a carriage on which a work is supplied and which has a reference member that is a reference for positioning of the work and a fixing unit that fixes the work on the carriage, a transport path on which the carriage is transported, and a control unit that is provided outside the carriage and controls motion of the fixing unit. The positioning apparatus includes: a positioning unit that presses the work, which has been positioned in a first direction on the carriage and has not yet been fixed by the fixing unit, in a second direction against the reference member to position the work in the second direction on the carriage, in which the second direction intersects with the first direction; and a drive unit that drives the positioning unit.

According to still another aspect of the present invention, provides is a processing system including the transport system described above; and a processing apparatus that applies a processing operation to the work fixed on the carriage by the fixing unit.

According to still another aspect of the present invention, provided is a positioning method for positioning a work on a carriage having a reference member that is a reference for positioning of the work. The positioning method includes steps of: pressing the work in a first direction against the reference member by using a first positioning unit to position the work in the first direction on the carriage; pressing the work which has been positioned in the first direction on the carriage in a second direction against the reference member by using a second positioning unit to position the work in the second direction on the carriage, in which the second direction intersects with the first direction; and fixing, to the carriage, the work positioned in the second direction on the carriage.

According to the present invention, it is possible to realize accurate and stable positioning of a work on a carriage and realize a reduction in weight and a reduction is size of the carriage.

Further features of the present invention will become apparent from the following description of exemplary embodiments with reference to the attached drawings.

BRIEF DESCRIPTION OF THE DRAWINGS

FIG. 2A is a schematic diagram illustrating the configuration of a transport apparatus according to the first embodiment of the present invention.

DESCRIPTION OF THE EMBODIMENTS

Preferred embodiments of the present invention will now be described in detail in accordance with the accompanying drawings.

First Embodiment

A first embodiment of the present invention will be described with reference to the drawings.

Figure 1:
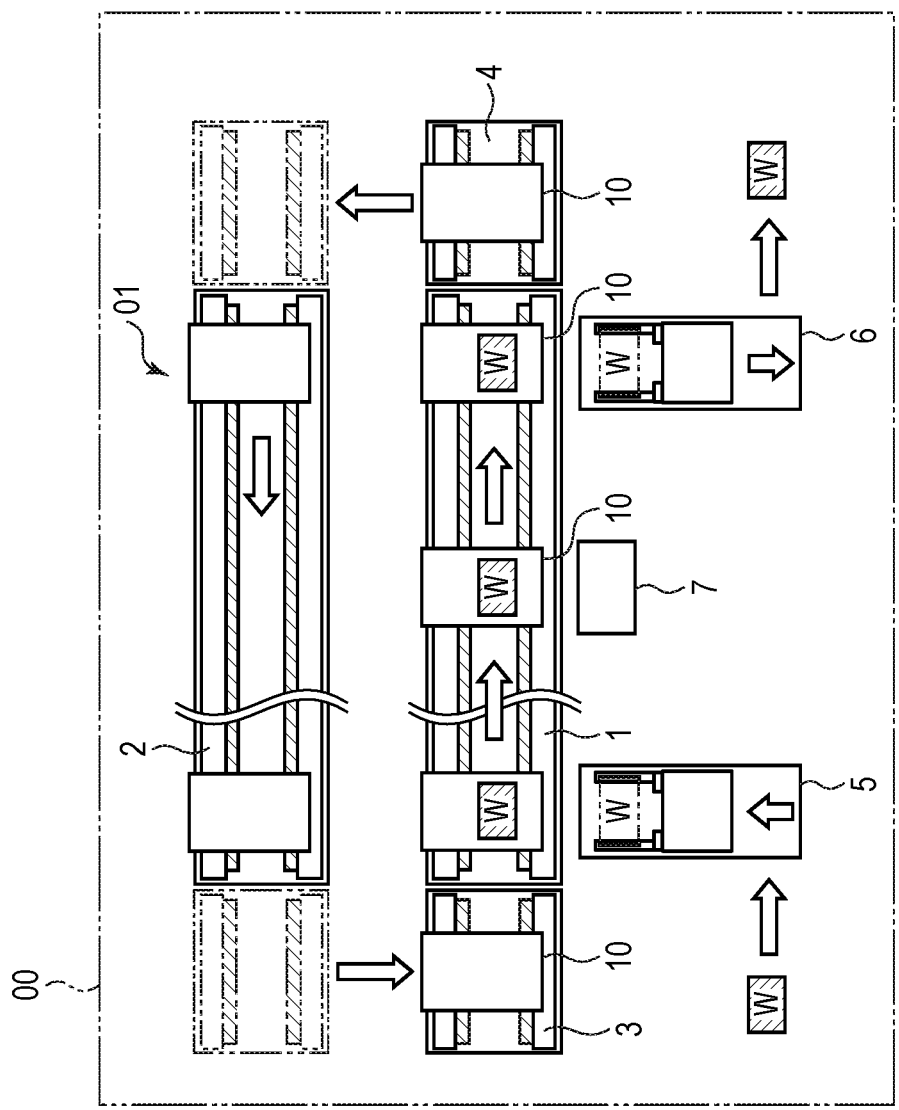
FIG. 1 is a schematic diagram illustrating the entire configuration of a processing system according to a first embodiment of the present invention.

First, the entire configuration of a processing system of the present embodiment will be described by using FIG. 1. FIG. 1 is a schematic diagram illustrating the entire configuration of a processing system according to the present embodiment and schematically depicts a diagram of the entire system when viewed from the top.

As illustrated in FIG. 1, a processing system 00 according to the present embodiment has a transport apparatus forward path 1, a transport apparatus reverse path 2, a carriage transfer apparatus 3, a carriage transfer apparatus 4, a work input apparatus 5, a work output apparatus 6, a processing apparatus 7, and transport carriages 10. Further, the processing system 00 according to the present embodiment has a work positioning apparatus 110 described later. The processing system 00 according to the present embodiment includes a transport system 01 that transports works W that are process objects to be processed and positions the works W on the transport carriages 10. The transport system 01 has the transport apparatus forward path 1, the transport apparatus reverse path 2, the carriage transfer apparatus 3, the carriage transfer apparatus 4, the transport carriages 10, and the work positioning apparatus 110. The transport apparatus forward path 1, the transport apparatus reverse path 2, the carriage transfer apparatus 3, and the carriage transfer apparatus 4 form a transport path of the transport carriages 10.

Coordinate axes and directions of an X-axis, a Y-axis, and a Z-axis of an XYZ coordinate system that is a rectangular coordinate system used in the following description are now defined. First, the X-axis is defined as an axis in the transport direction of the transport carriage 10 transported horizontally. Further, an axis orthogonal to a frame 23 placed horizontally described later, that is, an axis in the perpendicular direction is defined as the Z-axis, and an axis orthogonal to the X-axis and the Z-axis is defined as the Y-axis. In the XYZ coordinate system where the coordinate axes are defined as above, a direction in the X-axis is defined as an X-direction, and, of the X-direction, the same direction as the transport direction of the transport carriage 10 is defined as a +X-direction and the opposite direction to the +X-direction is a −X-direction. Further, a direction in the Y-axis is defined as a Y-direction, and, of the Y-direction, the direction from the right side to the left side with respect to the +X-direction is defined as a +Y-direction and the opposite direction to the +Y-direction is a −Y-direction. Further, a direction in the Z-axis is defined as a Z-direction, and, of the Z-direction, the direction from the transport path side to the transport carriage 10 side, that is, the perpendicular upward direction is defined as a +Z-direction and the direction from the transport carriage 10 side to the transport path side, that is, the perpendicular downward direction is defined as a −Z-direction.

In the processing system 00, the transport apparatus forward path 1 and the transport apparatus reverse path 2, which form linear transport paths for transporting the transport carriage 10, respectively, are installed in parallel to each other. The transport carriage 10 that is a carriage is transported along the transport apparatus forward path 1 and the transport apparatus reverse path 2. At the most upstream of the transport apparatus forward path 1, the carriage transfer apparatus 3 is installed. Further, at the most downstream of the transport apparatus forward path 1, the carriage transfer apparatus 4 is installed. The transport carriage 10 transported along the transport apparatus forward path 1 is transferred to the transport apparatus reverse path 2 by the carriage transfer apparatus 4. Further, the transport carriage 10 transported along the transport apparatus reverse path 2 is transferred to the transport apparatus forward path 1 by the carriage transfer apparatus 3. That is, the transport carriage 10 is circulated and transported along the transport apparatus forward path 1 and the transport apparatus reverse path 2. Note that a single transport carriage 10 may be installed or a plurality of transport carriages 10 may be installed.

In the upstream of the transport apparatus forward path 1, the work input apparatus 5 that is a work supply apparatus for supplying and loading a work W on the transport carriage 10 is installed. In the downstream of the transport apparatus forward path 1, the work output apparatus 6 that picks out a work W from the transport carriage 10 for output is installed.

One or a plurality of processing apparatuses 7 are installed between the work input apparatus 5 and the work output apparatus 6. The plurality of processing apparatus 7 are installed at predetermined intervals. The processing apparatus 7 applies a predetermined processing operation such as assembly of a component or application to a work W fixed on the transport carriage 10. Note that the processing apparatus 7 is not limited in particular, and any processing apparatus that applies various processing operations to a work W can be used.

The transport carriage 10 is a carriage sequentially transported among the work input apparatus 5, the processing apparatus 7, and the work output apparatus 6 installed at predetermined intervals with respect to the transport apparatus forward path 1. A work W is supplied to the work input apparatus 5 and then input to the transport carriage 10. Next, after the work W is positioned and fixed on the transport carriage 10, a predetermined processing operation is applied by the processing apparatus 7 to the work W on the transport carriage 10. After the completion of all the processing operations performed by the processing apparatus 7, the work W is picked out from the top of the transport carriage 10 by the work output apparatus 6.

Next, the configuration of the transport apparatus forward path 1, the transport apparatus reverse path 2, the carriage transfer apparatuses 3 and 4, and the transport carriage 10 in the transport system 01 will be described in detail by using FIG. 2A to FIG. 2C.

Figure 2B:
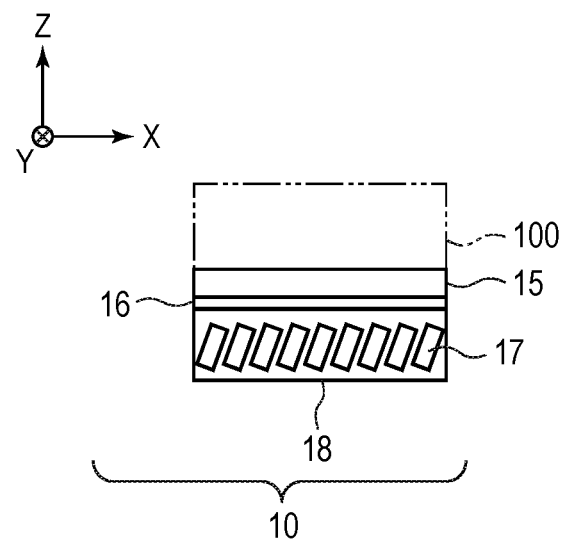
FIG. 2B is a schematic diagram illustrating the configuration of the transport apparatus according to the first embodiment of the present invention.

FIG. 2A is a diagram of the transport apparatus forward path 1 viewed from the Y-direction. FIG. 2B is a diagram of the transport carriage 10 viewed from the Y-direction. FIG. 2C is a diagram of the transport apparatus forward path 1 and the transport carriage 10 viewed from the X-direction.

The transport apparatus forward path 1 is configured as modules and has a plurality of transport modules 11. The processing system 00 has a plurality of lower-level controllers 43 communicably connected to the plurality of transport modules 11, the carriage transfer apparatus 3, and the carriage transfer apparatus 4, respectively. The lower-level controllers 43 control the connected transport modules 11 or the carriage transfer apparatuses 3 and 4.

Note that, in FIG. 2A, for simplified illustration, two transport modules 11 are illustrated, and two lower-level controllers 43a and 43b are illustrated as lower-level controllers 43 connected to respective transport modules 11. Further, lower-level controllers 43c and 43d are illustrated as the lower-level controllers 43 connected to the carriage transfer apparatus 3. Further, lower-level controllers 43e and 43f are illustrated as the lower-level controllers 43 connected to the carriage transfer apparatus 4. In the description, unless required to be distinguished in particular, a lower-level controller is simply denoted as "lower-level controller 43". The plurality of lower-level controllers 43 are communicably connected to the lower-level controller network 42.

The processing system 00 further has a middle-level controller 41 and a higher-level controller 40. The middle-level controller 41 is communicably connected to the plurality of lower-level controllers 43 via the lower-level controller network 42. The middle-level controller 41 controls the plurality of lower-level controllers 43. Furthermore, the higher-level controller 40 that transmits an operation instruction to the middle-level controller 41 is communicably connected to the middle-level controller 41.

Figure 2C:
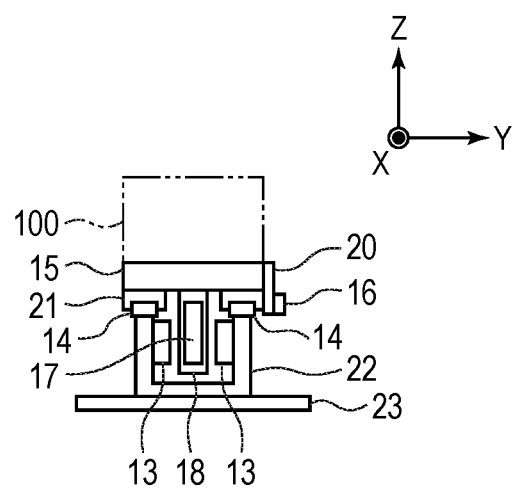
FIG. 2C is a schematic diagram illustrating the configuration of the transport apparatus according to the first embodiment of the present invention.

As illustrated in FIG. 2A and FIG. 2C, the transport modules 11 are installed on a horizontal installation face of the frame 23. The transport module 11 has a transport module casing 22, encoders 12a, 12b, and 12c, a group of coils 13, and a guiderail 14. Further, a power source (not shown) is connected to the lower-level controller 43. Note that, in the following description, unless required to be distinguished in particular, the encoders 12*a*, 12*b*, and 12*c* are simply denoted as "encoder 12". Note that the number and the attachment positions of the encoders 12 can be set as appropriate in accordance with the size of the transport carriage 10 or the transport module 11, the accuracy of position detection of the transport carriage 10, or the like.

The transport module casings 22 are installed on the horizontal installation face of the frame 23. The encoders 12 are attached to a plurality of positions of the transport module casings 22. The group of coils 13 are attached to the transport module casings 22 along the X-direction. The guiderails 14 are attached on the transport module casings 22 along the X-direction.

As illustrated in FIG. 2B and FIG. 2C, the transport carriage 10 has a top plate 15, a scale 16, a plurality of permanent magnets 17, a permanent magnet bracket 18, a scale bracket 20, a guide block 21, and a work positioning mechanism 100.

The guide block 21 is attached to the under face of the top plate 15. The permanent magnet bracket 18 is attached to the under face of the top plate 15. The scale bracket 20 is attached to the side face extending in the X-direction of the top plate 15. The plurality of permanent magnets 17 are attached to the permanent magnet bracket 18 so as to be aligned in the X-direction. The scale 16 is attached to the scale bracket 20.

The work positioning mechanism 100 is attached on the top plate 15. The work positioning mechanism 100 is to position a work W on the transport carriage 10 in the Z-direction and fix the work W on the transport carriage 10.

The guide block 21 attached to the top plate 15 is guided by the guiderail 14, and the transport carriage 10 is arranged on the transport module 11 so as to be able to move in the X-direction. The scale 16 is attached to the top plate 15 via the scale bracket 20 and has a pattern used for position detection of the transport carriage 10.

With a current being applied to the group of coils 13, electromagnetic force that drives the transport carriage 10 is generated between the plurality of permanent magnets 17 attached to the top plate 15 via the permanent magnet bracket 18 and the group of coils 13 attached to the transport module casings 22. The transport carriage 10 is driven by electromagnetic force generated between the plurality of permanent magnets 17 and the group of coils 13 and transported in the +X-direction on the transport apparatus forward path 1. Accordingly, the transport system 01 with a moving magnet (MM) type linear motor is configured in the present embodiment.

The encoders 12 of the transport module 11 are attached to the transport module casing 22 such that the gap to the scale 16 attached to the transport carriage 10 is constant. The encoder 12 can detect the position of the transport carriage 10 in the X-direction as a relative position from the encoder 12 by reading the pattern of the scale 16.

The encoders 12 are installed to positions so as to be able to detect the transport carriage 10 located at any position on the transport module 11.

The lower-level controller 43 can calculate the position of the transport carriage 10 on the transport module 11 based on the output of the connected encoders 12 and the positions where those encoders 12 are installed. The lower-level controller 43 can control a current amount applied to the group of coils 13 in accordance with the calculated position of the transport carriage 10 or the like. This enables the lower-level controller 43 to transport the transport carriage 10 up to a predetermined position at a predetermined speed and stop it.

Further, the lower-level controller 43 can use the encoders 12 to detect that the transport carriage 10 enters the connected transport module 11 from the neighboring transport module 11. The lower-level controller 43 controls the transport carriage 10 within the connected transport module 11 in order to transport the transport carriage 10 that has entered the connected transport module 11 up to a predetermined position at a predetermined speed and stop it.

Each of the lower-level controllers 43 has a communication function for communicating information with the middle-level controller 41. The lower-level controller 43 communicates with the middle-level controller 41 for position information or the like of the transport carriage 10 detected by the encoders 12 belonging to the lower-level controller 43.

The middle-level controller 41 can transmit instructions for operating the transport carriage 10 to each of the lower-level controllers 43. This enables the middle-level controller 41 to control the plurality of transport carriages 10.

Note that the transport apparatus reverse path 2 also has the same configuration as the above-described transport apparatus forward path 1 except that the transport direction of the transport carriage 10 is opposite to the transport direction in the transport apparatus forward path 1.

Next, the configuration of the carriage transfer apparatus 3 and the carriage transfer apparatus 4 will be described. As illustrated in FIG. 2A, each of the carriage transfer apparatus 3 and the carriage transfer apparatus 4 has a carriage transfer actuator 31 that is movable in the Y-direction and a module that is loaded on the carriage transfer actuator 31 and has the same configuration as the transport module 11.

The lower-level controller 43*c* connected to the carriage transfer apparatus 3 controls the carriage transfer actuator 31 of the carriage transfer apparatus 3. The lower-level controller 43*d* connected to the carriage transfer apparatus 3 controls a module having the same configuration as the transport module 11 of the carriage transfer apparatus 3 in a similar manner to the lower-level controllers 43*a* and 43*b*. Further, the lower-level controller 43*e* connected to the carriage transfer apparatus 4 controls the carriage transfer actuator 31 of the carriage transfer apparatus 4. The lower-level controller 43*f* connected to the carriage transfer apparatus 4 controls a module having the same configuration as the transport module 11 of the carriage transfer apparatus 4 in a similar manner to the lower-level controllers 43*a* and 43*b*.

The carriage transfer apparatus 3 and the carriage transfer apparatus 4 move between the transport apparatus forward path 1 and the transport apparatus reverse path 2 to transfer the transport carriage 10, respectively. The carriage transfer apparatus 4 transfers, from the transport apparatus forward path 1 to the transport apparatus reverse path 2, the transport carriage 10 transported along the transport apparatus forward path 1. The carriage transfer apparatus 3 transfers, from the transport apparatus reverse path 2 to the transport apparatus forward path 1, the transport carriage 10 transported along the transport apparatus reverse path 2.

The higher-level controller 40 controls the entire processing system 00 and is communicably connected to a controller 53 (see FIG. 7) provided for the processing apparatus 7 that controls the processing apparatus 7 or the like in addition to the middle-level controller 41. The higher-level controller 40 controls the operation of each apparatus and the order of operations in the processing system 00.

Next, the configuration of the work positioning mechanism 100 on the transport carriage 10 and the work positioning apparatus 110 that positions a work W on the transport carriage 10 will be described by using FIG. 3 and FIG. 4.

Figure 3:
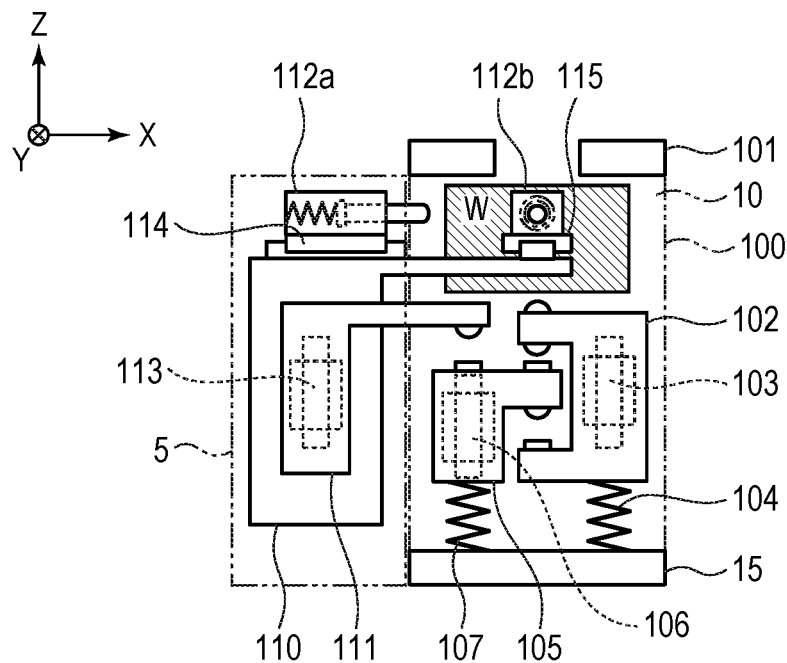
FIG. 3 is a schematic diagram illustrating the configuration of a transport carriage and a work positioning apparatus according to the first embodiment of the present invention.

FIG. 3 is a schematic diagram illustrating the configuration of the transport carriage 10 and the work positioning apparatus 110, which is a diagram of the transport carriage 10 and the work positioning apparatus 110 viewed from the Y-direction. FIG. 4 is a top view illustrating the configuration of the transport carriage 10 and the work positioning apparatus 110.

The work positioning mechanism 100 on the transport carriage 10 is a positioning mechanism for positioning a work W on the transport carriage 10 in the Z-direction. As illustrated in FIG. 3, the work positioning mechanism 100 has a contact reference 101 that is a reference member used as a reference that comes into contact with a work W to position the work W. Further, the work positioning mechanism 100 has a Z-direction press unit 102 that causes a work W to come into contact with the contact reference 101 and a linear motion guide 103 for motion guide of the Z-direction press unit 102. Further, the work positioning mechanism 100 has a spring 104 provided for the Z-direction press unit 102 to generate pushing force that moves the Z-direction press unit 102. Note that, instead of the spring 104, pushing means such as an elastic member, a magnet, or the like other than a spring may be used.

Furthermore, the work positioning mechanism 100 has a fixing unit 105 that fixes a work W, a linear motion guide 106 for motion guide of the fixing unit 105, and a spring 107 provided for the fixing unit 105 to generate pushing force that moves the fixing unit 105. Note that, instead of the spring 107, pushing means such as an elastic member, a magnet, or the like other than a spring may be used.

The contact reference 101 that is a reference member for positioning is provided above the top plate 15 of the transport carriage 10 so as to be located above a work W input to the transport carriage 10 by the work input apparatus 5. A work W is pressed against the contact reference 101 in the +Z-direction by the Z-direction press unit 102, pressed against the contact reference 101 in the +X-direction by the X-direction press unit 112a, and pressed against the contact reference 101 in the +Y-direction by the Y-direction press unit 112b.

Note that, in the contact reference 101, portions against which a work W is pressed in each direction of the +X-direction, the +Y-direction, and the +Z-direction may be integrally provided. Further, a plurality of contact references 101 to be pressed in each direction of the +X-direction, the +Y-direction, and the +Z-direction may be separately provided.

The Z-direction press unit 102 is arranged so as to face the contact reference 101 via a space where a work W is input by the work input apparatus 5. The Z-direction press unit 102 is a positioning unit that presses a work W against the contact reference 101 in the Z-direction, more specifically, in the +Z-direction that is perpendicularly upward and positions the work W on the transport carriage 10 in the Z-direction. The Z-direction press unit 102 is guided by the linear motion guide 103, which is movable in the Z-direction, and coupled to the top plate 15 via the spring 104. The spring 104 generates pushing force that pushes the Z-direction press unit 102 in the +Z-direction.

When the work W has not yet been supplied on the transport carriage 10 and thus no work W is on the transport carriage 10, the Z-direction press unit 102 is located in the following position. That is, the Z-direction press unit 102 is located at a position where the interval between the Z-direction press unit 102 and the contact reference 101 is shorter than the size in the Z-direction of the work W. When the work W is supplied, the Z-direction press unit 102 is pressed down by a press control lever 111, and thereby a clearance through which the work W is supplied occurs between the contact reference 101 and the Z-direction press unit 102.

The fixing unit 105 is provided above the top plate 15 of the transport carriage 10 so as to be able to come into contact with the Z-direction press unit 102 in both of the +Z-direction and the −Z-direction. The fixing unit 105 is guided by the linear motion guide 106 movably in the Z-direction and coupled to the top plate 15 via the spring 107. The spring 107 generates pushing force that pushes the fixing unit 105 in the +Z-direction.

Next, the configuration of the work positioning apparatus 110 will be described. The work positioning apparatus 110 is provided outside the transport carriage 10. Specifically, the work positioning apparatus 110 is provided to the work input apparatus 5 that is a work supply apparatus. Note that the work positioning apparatus 110 is not necessarily required to be provided to the work input apparatus 5 outside the transport carriage 10 and may be provided separately from the work input apparatus 5.

The work positioning apparatus 110 is a positioning apparatus that positions a work W on the transport carriage 10 in the X-direction and the Y-direction. The work positioning apparatus 110 has the press control lever 111, the X-direction press unit 112a, and the Y-direction press unit 112b. Further, the work positioning apparatus 110 has a linear motion guide 113 for motion guide of the press control lever 111, a linear motion guide 114 for motion guide of the X-direction press unit 112a, and a linear motion guide 115 for motion guide of the Y-direction press unit 112b.

The press control lever 111 is a lever used for controlling the motion of the fixing unit 105 and the Z-direction press unit 102. The press control lever 111 is provided so as to be able to be guided by the linear motion guide 113 movable in the Z-direction to move in the −Z-direction and come into contact with the fixing unit 105. As illustrated in FIG. 4, the press control lever 111 is attached to an attachment base 116 provided to the side of the transport apparatus forward path 1. A positioning drive motor 301 (see FIG. 5 and FIG. 6) that moves the press control lever 111, the X-direction press unit 112a, and the Y-direction press unit 112b is provided to the attachment base 116.

The X-direction press unit 112a is provided so as to be able to be guided by the linear motion guide 114 movable in the X-direction and located in the side of the work W positioned on the transport carriage 10 in the Z-direction by the Z-direction press unit 102. The X-direction press unit 112a is configured to be able to come into contact in the +X-direction with a work W positioned by the Z-direction press unit 102 to press the work W against the contact reference 101 in the +X-direction. The X-direction press unit 112a presses the work W against the contact reference 101 by, for example, a spring pressing system. The X-direction press unit 112a positions the work W in the X-direction by pressing the work W in the +X-direction against the contact reference 101 accordingly.

As discussed above, the X-direction press unit 112a is a positioning unit that positions a work W on the transport carriage 10 in the X-direction by pressing the work W against the contact reference 101 in the X-direction, more specifically, in the +X-direction. While the work W positioned by the X-direction press unit 112a has been positioned on the transport carriage 10 in the Z-direction by the Z-direction press unit 102, this has not yet been fixed by the fixing unit 105. The X-direction in which the X-direction press unit 112a positions a work W is a direction orthogonal to the Z-direction in which the Z-direction press unit 102 positions the work W. Note that the direction in which the X-direction press unit 112a positions a work W is not necessarily required to be orthogonal to the direction in which the Z-direction press unit 102 positions the work W and may be a direction intersecting with the direction in which the Z-direction press unit 102 positions the work W.

The Y-direction press unit 112b is provided so as to be able to be guided by the linear motion guide 115 movable in the Y-direction and located in the side of the work W positioned on the transport carriage 10 in the Z-direction by the Z-direction press unit 102. The Y-direction press unit 112b is configured to be able to come into contact in the +Y-direction with a work W positioned by the Z-direction press unit 102 to press the work W against the contact reference 101 in the +Y-direction. The Y-direction press unit 112b presses the work W against the contact reference 101 by, for example, a spring pressing system. The Y-direction press unit 112b positions the work W in the Y-direction by pressing the work Win the +Y-direction against the contact reference 101 accordingly.

As discussed above, the Y-direction press unit 112b is a positioning unit that positions a work W on the transport carriage 10 in the Y-direction by pressing the work W against the contact reference 101 in the Y-direction, more specifically, in the +Y-direction. While the work W positioned by the Y-direction press unit 112b has been positioned on the transport carriage 10 in the Z-direction by the Z-direction press unit 102, this has not yet been fixed by the fixing unit 105. The Y-direction in which the Y-direction press unit 112b positions a work W is a direction orthogonal to the Z-direction in which the Z-direction press unit 102 positions the work W. Note that the direction in which the Y-direction press unit 112b positions a work W is not necessarily required to be orthogonal to the direction in which the Z-direction press unit 102 positions the work W and may be a direction intersecting with the direction in which the Z-direction press unit 102 positions the work W.

The press control lever 111 is a control unit that controls the motion of the Z-direction press unit 102 and the fixing unit 105. When moving in the −Z-direction, the press control lever 111 comes into contact with the fixing unit 105. When further moving in the −Z-direction, the press control lever 111 engages with the fixing unit 105 pushed in the +Z-direction by the spring 107. Then, the press control lever 111 presses down the fixing unit 105 in the −Z-direction against the pushing force of the spring 107. This causes the spring 107 to contract and the fixing unit 105 to move in the −Z-direction and come into contact with the Z-direction press unit 102.

When the press control lever 111 further presses down the fixing unit 105 in the −Z-direction, the fixing unit 105 engages with the Z-direction press unit 102 pushed by the spring 104. The fixing unit 105 then presses down the Z-direction press unit 102 in the −Z-direction against the pushing force of the spring 104. This causes the spring 104 to contract and the Z-direction press unit 102 to move in the −Z-direction.

As described above, in response to the press control lever 111 moving in the −Z-direction, the fixing unit 105 and the Z-direction press unit 102 move in the −Z-direction. Thereby, a predetermined clearance occurs between the contact reference 101 and the Z-direction press unit 102. In this state, the work input apparatus 5 supplies a work W between the contact reference 101 and the Z-direction press unit 102.

After the work W is supplied, in response to the press control lever 111 moving in the +Z-direction, first, the Z-direction press unit 102 comes into contact with the work W. The Z-direction press unit 102 further presses the work W against the contact reference 101 in the perpendicularly upward +Z-direction by using the pushing force of the spring 104. Accordingly, the work W is positioned on the transport carriage 10 in the Z-direction by the Z-direction press unit 102.

Next, the X-direction press unit 112a and the Y-direction press unit 112b move to perform positioning of the X-direction and the Y-direction, respectively. The X-direction press unit 112a presses the work Win the +X-direction against the contact reference 101 to position the work Win the X-direction. Further, the Y-direction press unit 112b presses the work Win the +Y-direction against the contact reference 101 to position the work W in the Y-direction. At this time, the work W is in contact with the contact reference 101 and the Z-direction press unit 102 and thus subjected to a sliding frictional resistance. Thus, the X-direction press unit 112a and the Y-direction press unit 112b push the work W with force that can overcome the sliding frictional resistance, respectively. That is, the X-direction press unit 112a and the Y-direction press unit 112b push the work W with force greater than the friction force occurring between the work W and the contact reference 101 and between the work W and the Z-direction press unit 102, respectively. The friction force is force obtained by multiplying the normal force generated by the pushing force of the spring 104 by a friction coefficient between the work W and the contact reference 101 and between the work W and the Z-direction press unit 102.

In response to the X-direction press unit 112a and the Y-direction press unit 112b moving as described above, the work W comes into contact with the contact reference 101 and is positioned. The press control lever 111 further moves in the +Z-direction with respect to the work W positioned as described above, and thereby the fixing unit 105 comes into contact with the Z-direction press unit 102. Thereby, the fixing unit 105 presses the work W against the contact reference 101 via the Z-direction press unit 102 to fix the work W. At this time, as a result of the pushing force of the spring 107 being transmitted to the work Win addition to the pushing force of the spring 104, the work W is firmly fixed. The force with which only the Z-direction press unit 102 presses the work W against the contact reference 101 is force applied by the spring 104. On the other hand, the force with which the fixing unit 105 presses the work W against the contact reference 101 is force applied by the springs 104 and 107. Therefore, the force with which the fixing unit 105 presses the work W against the contact reference 101 is greater than the force with which only the Z-direction press unit 102 presses the work W against the contact reference 101.

Figure 4:
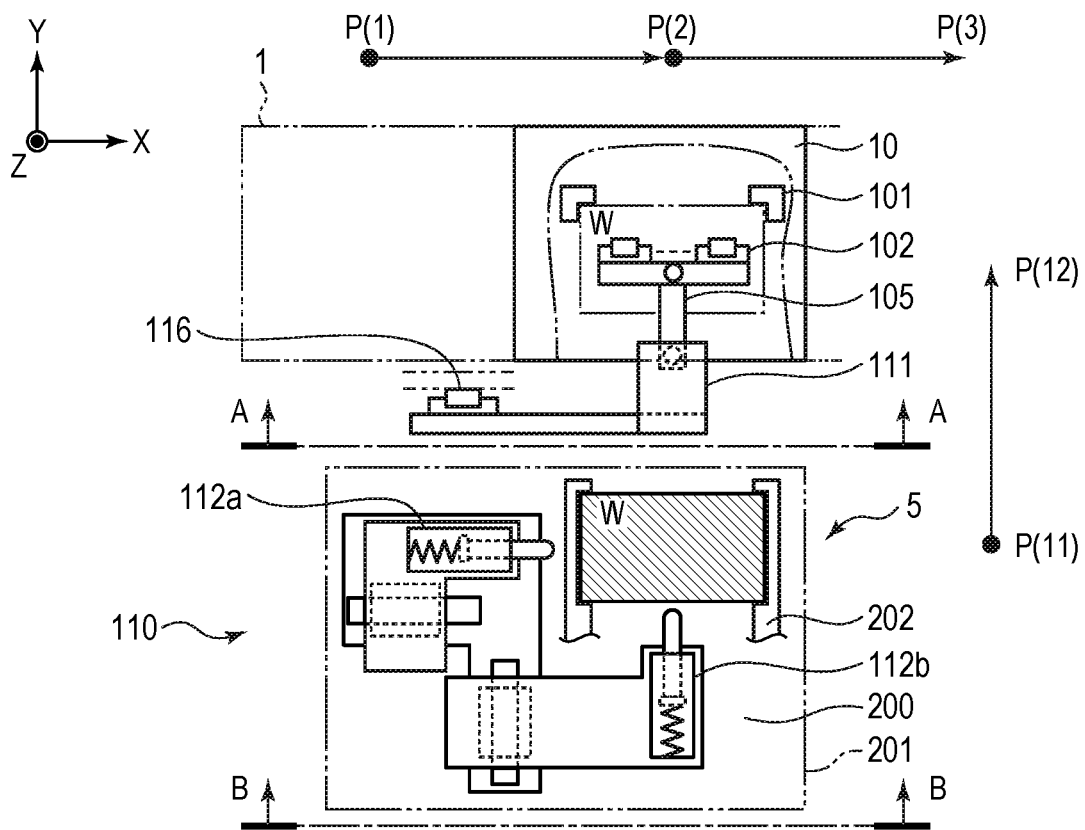
FIG. 4 is a top view illustrating the configuration of the transport carriage and the work positioning apparatus according to the first embodiment of the present invention.

As illustrated in FIG. 4, the transport carriage 10 moves in the +X-direction along the transport apparatus forward path 1. In FIG. 4, each of teaching points P(1), P(2), and P(3) illustrated in this order in the +X-direction is a teaching point that teaches the position of the transport carriage 10. The teaching point P(1) is a teaching point that teaches the position of the transport carriage 10 on the carriage transfer apparatus 3. The teaching point P(2) is a teaching point that teaches the position of the transport carriage 10 provided for the work input apparatus 5. The teaching point P(3) is a teaching point that teaches the position of the transport carriage 10 provided for the processing apparatus 7. After the transport carriage 10 with no work W loaded moves from the teaching point P(1) to the teaching point P(2), an input operation of a work W to the transport carriage 10 is performed. The input work W on the transport carriage 10 is transported to the processing apparatus 7 (not shown in FIG. 4) by the transport carriage 10 moving to the teaching point P(3). On the transport carriage 10, a predetermined processing operation is performed by the processing apparatus 7 on the work W that has been transported to the processing apparatus 7.

In the work input apparatus 5, a work input actuator 201 that moves the work input apparatus 5 in the Y-direction is provided. Further, a work input positioning mechanism 200 is provided on the work input actuator 201. In FIG. 4, each of teaching points P(11) and P(12) illustrated in this order in the +Y-direction is a teaching point that teaches the position of the work input actuator 201. The teaching point P(11) is a teaching point where input of a work W to the transport carriage 10 is prepared. The teaching point P(12) is a teaching point where the work W is input to the transport carriage 10 and the work W is passed. On the work input apparatus 5, work grip claws 202 is provided in addition to the X-direction press unit 112a and the Y-direction press unit 112b. The work input apparatus 5 inputs the work W gripped by the work grip claws 202 to the transport carriage 10.

In an input operation of a work W, first, the transport carriage 10 with no work W loaded moves from the teaching point P(1) to the teaching point P(2). Next, with the motion of the press control lever 111 installed on the attachment base 116, a predetermined clearance occurs between the contact reference 101 and the Z-direction press unit 102 as described above. Accordingly, input of the work W is prepared.

Next, the work input actuator 201 causes the work input apparatus 5 to move from the teaching point P(11) to the teaching point P(12), and an input operation of the work W to the transport carriage 10 is performed. Then, with the motion of the press control lever 111 and the motion of the X-direction press unit 112a and the Y-direction press unit 112b, positioning of the work W on the transport carriage 10 is performed.

After the completion of the positioning operation, the work input actuator 201 causes the work input apparatus 5 to move from the teaching point P(12) to the teaching point P(11). The transport carriage 10 on which the positioned work W has been loaded moves to the teaching point P(3).

Figure 5:
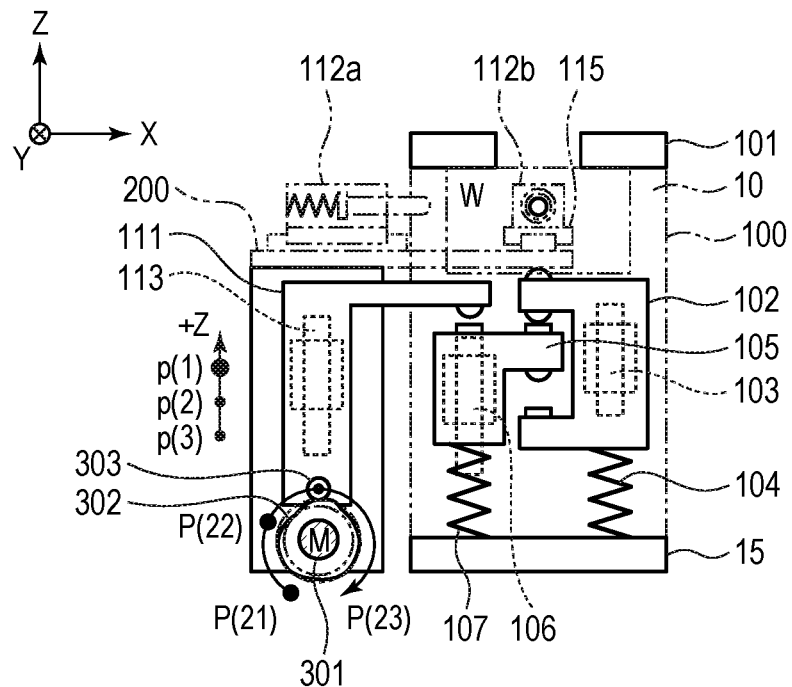
FIG. 5 is an arrow view A taken in a direction of an arrow A from the arrow A side illustrated in FIG. 4 of the transport carriage and the work positioning apparatus according to the first embodiment of the present invention.

Next, the configuration of the press control lever 111 on the work input apparatus 5 will be described by using FIG. 5. FIG. 5 is an arrow view A taken in a direction of an arrow A from the arrow A side illustrated in FIG. 4 of the transport carriage 10 and the work positioning apparatus 110.

As illustrated in FIG. 5, for the press control lever 111, the positioning drive motor 301 that drives the press control lever 111 is provided. A drive cam 302 that rotates in response to rotation of the positioning drive motor 301 and drives the press control lever 111 is provided to the positioning drive motor 301. A cam follower 303 that follows rotation of the drive cam 302 is provided to the press control lever 111. The press control lever 111 is configured to move in the Z-direction by the rotary motion of the drive cam 302 being converted to linear motion via the cam follower 303 and transmitted thereto.

FIG. 5 illustrates teaching points P(21), P(22), and P(23) that teach rotation positions of the positioning drive motor 301 clockwise around the outer circumference of the drive cam 302. The teaching points P(21), P(22), and P(23) are as described below, respectively. Note that FIG. 5 illustrates positions p(1), p(2), and p(3) in the Z-direction of the press control lever 111 in accordance with rotation of the positioning drive motor 301 in this order in the −Z-direction.

The teaching point P(21) is a teaching point that teaches standby of the positioning drive motor 301. The position of the press control lever 111 at the teaching point P(21) is the position p(1) where the press control lever 111 stands by. The teaching point P(22) is a teaching point that teaches release of the press control lever 111. The position of the press control lever 111 at the teaching point P(22) is the position p(3) where the press control lever 111 is released and located at the undermost point. The teaching point P(23) is a teaching point that teaches the completion of driving of the positioning drive motor 301. The positioning drive motor 301 rotates by 360 degrees for one positioning operation. Thus, the teaching point P(21) that teaches standby of the positioning drive motor 301 and the teaching point P(23) that teaches the completion of driving of the positioning drive motor 301 are the same point. Thus, the position of the press control lever 111 at the teaching point P(23) is the position p(1). Once the press control lever 111 again returns to the position p(1) accordingly, the work W is fixed by the Z-direction press unit 102 that is in contact with the work W and the fixing unit 105 that is in contact with the Z-direction press unit 102. Note that the position p(2) between the position p(1) and the position p(3) is a press position where the fixing unit 105 is not in contact with the Z-direction press unit 102 and only the Z-direction press unit 102 is in contact with the work W.

Figure 6:
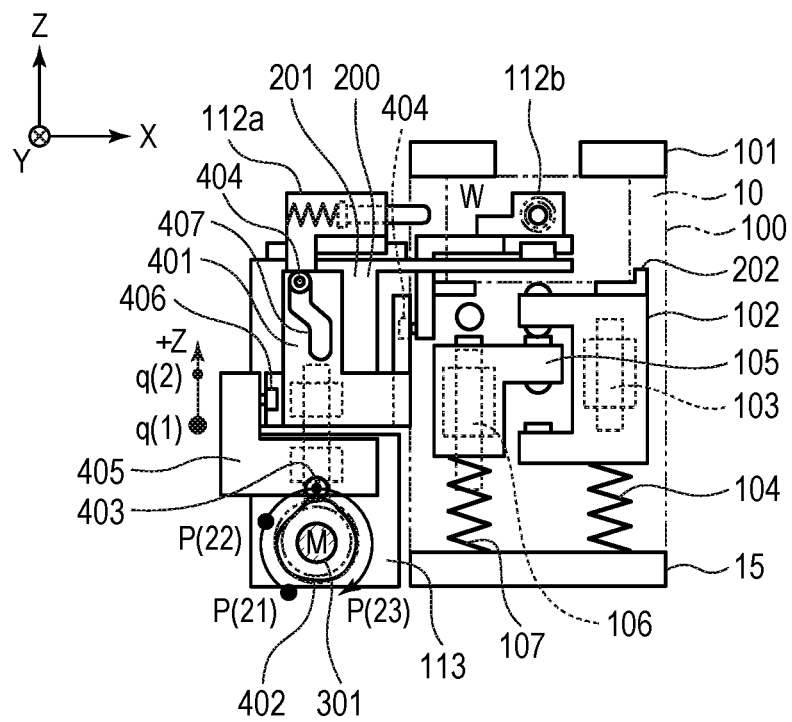
FIG. 6 is an arrow view B taken in a direction of an arrow B from the arrow B side illustrated in FIG. 4 of the transport carriage and the work positioning apparatus according to the first embodiment of the present invention.

Next, the configuration of the work input positioning mechanism 200 on the work input apparatus 5 will be described by using FIG. 6. FIG. 6 is an arrow view B taken in a direction of an arrow B from the arrow B side illustrated in FIG. 4 of the transport carriage 10 and the work positioning apparatus 110.

A drive cam 402 that rotates in response to rotation of the positioning drive motor 301 and drives the X-direction press unit 112a and the Y-direction press unit 112b is provided to the positioning drive motor 301 provided on the attachment base 116. A driven mechanism 405 that follows the rotation of the of the drive cam 402 and moves in the Z-direction is provided on the work input actuator 201. A cam follower 403 that follows the rotation of the drive cam 402 is provided to the driven mechanism 405. A drive mechanism 401 that moves in the Z-direction in accordance with the motion of the driven mechanism 405 is provided on the driven mechanism 405. The drive mechanism 401 is to drive the X-direction press unit 112a and the Y-direction press unit 112b. A transmission mechanism 406 that transmits the motion of the driven mechanism 405 to the drive mechanism 401 is provided between the driven mechanism 405 and the drive mechanism 401. A groove 407 with which cam followers 404 provided to the X-direction press unit 112a and the Y-direction press unit 112b engage, respectively, is provided in the drive mechanism 401.

In response to the rotation of the positioning drive motor 301, the drive cam 402 rotates. The rotary motion of the drive cam 402 is converted to linear motion via the cam follower 403 and transmitted to the driven mechanism 405. Thereby, the driven mechanism 405 moves in the Z-direction.

The motion of the driven mechanism 405 in the Z-direction is transmitted to the drive mechanism 401 via the transmission mechanism 406. Thereby, the drive mechanism 401 moves in the Z-direction.

The motion of the drive mechanism 401 in the Z-direction causes the cam follower 404 engaging with the groove 407 to change the position thereof in the horizontal direction. That is, the cam follower 404 provided to the X-direction press unit 112*a* changes the position thereof in the X-direction. The cam follower 404 provided to the Y-direction press unit 112*b* changes the position thereof in the Y-direction. In response to such a change in the positions of the cam followers 404, the X-direction press unit 112*a* moves in the X-direction, and the Y-direction press unit 112*b* moves in the Y-direction.

FIG. 6 illustrates positions q(1) and q(2) of the drive mechanism 401 operating in the Z-direction. The position q(1) is a position where the X-direction press unit 112*a* and the Y-direction press unit 112*b* stand by. The position q(2) is a position where positioning is performed by the X-direction press unit 112*a* and the Y-direction press unit 112*b*.

In response to the drive mechanism 401 moving from the position q(1) to the position q(2), the X-direction press unit 112*a* and the Y-direction press unit 112*b* move in the +X-direction and the +Y-direction and perform positioning of the work W in the X-direction and the Y-direction, respectively. In response to the drive mechanism 401 again moving from the position q(2) to the position q(1), the X-direction press unit 112*a* and the Y-direction press unit 112*b* move and withdraw in the −X-direction and the −Y-direction, respectively.

As described above, a drive unit that drives the X-direction press unit 112*a* and the Y-direction press unit 112*b* is formed of the positioning drive motor 301, the drive cam 402, the driven mechanism 405, the cam follower 403, the drive mechanism 401, and the cam followers 404. Accordingly, the drive unit that drives the X-direction press unit 112*a* and the Y-direction press unit 112*b* is provided outside the transport carriage 10.

As described above, the X-direction press unit 112*a*, the Y-direction press unit 112*b*, and the press control lever 111 are configured to be interlocked and move with each other via the drive cam 302 and the drive cam 402 in accordance with the operation of the positioning drive motor 301.

Figure 7:
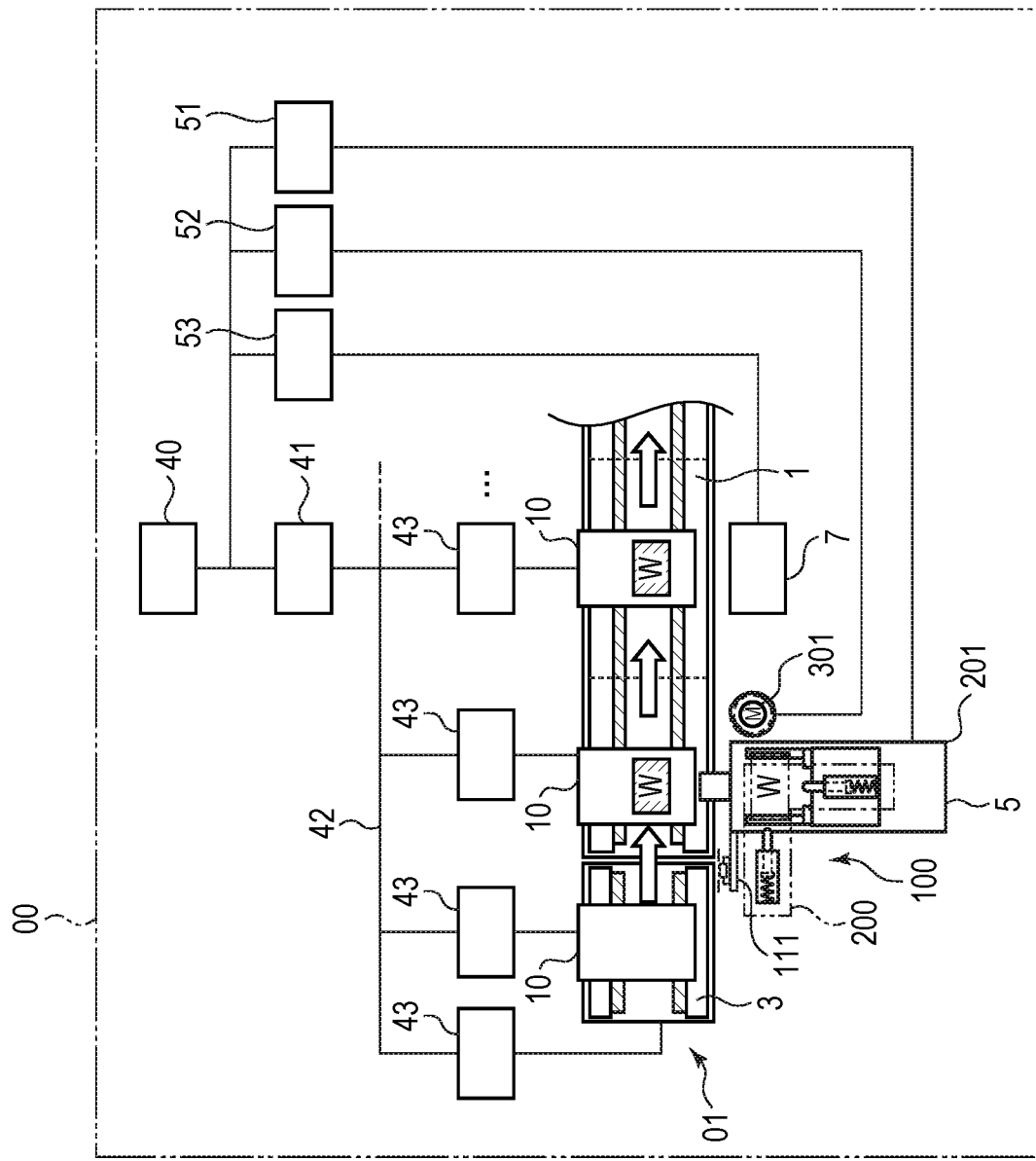
FIG. 7 is a schematic diagram illustrating a system configuration of the processing system according to the first embodiment of the present invention.

Next, a system configuration of the processing system 00 according to the present embodiment will be described by using FIG. 7. FIG. 7 is a schematic diagram illustrating the system configuration of the processing system 00 according to the present embodiment.

The processing system 00 has the higher-level controller 40, the middle-level controller 41, and the lower-level controllers 43, as described above. The higher-level controller 40 is to control the entire operation of the processing system 00. The middle-level controller 41 transmits an instruction to the lower-level controller 43 to control the motion of the transport carriage 10. The lower-level controller 43 controls the transport of the transport carriage 10 based on an instruction transmitted from the middle-level controller 41.

Further, the processing system 00 has a controller 51, which is provided for the work input actuator 201, that controls the work input actuator 201 and a controller 52, which is provided for the positioning drive motor 301, that controls the positioning drive motor 301. The processing system 00 further has a controller 53, which is provided for the processing apparatus 7, that controls the processing apparatus 7. The controllers 51, 52, and 53 are communicably connected to the higher-level controller 40, respectively.

The processing system 00 is configured to perform pre-determined processing on the work W by the higher-level controller 40 sequentially transmitting instructions that instruct predetermined operations and the order thereof to respective controllers 41, 43, 51, 52, and 53.

Next, the input operation of a work W to the transport carriage 10 and the positioning operation of the work W will be described by using FIG. 8 and FIG. 9A to FIG. 9H.

Figure 8:
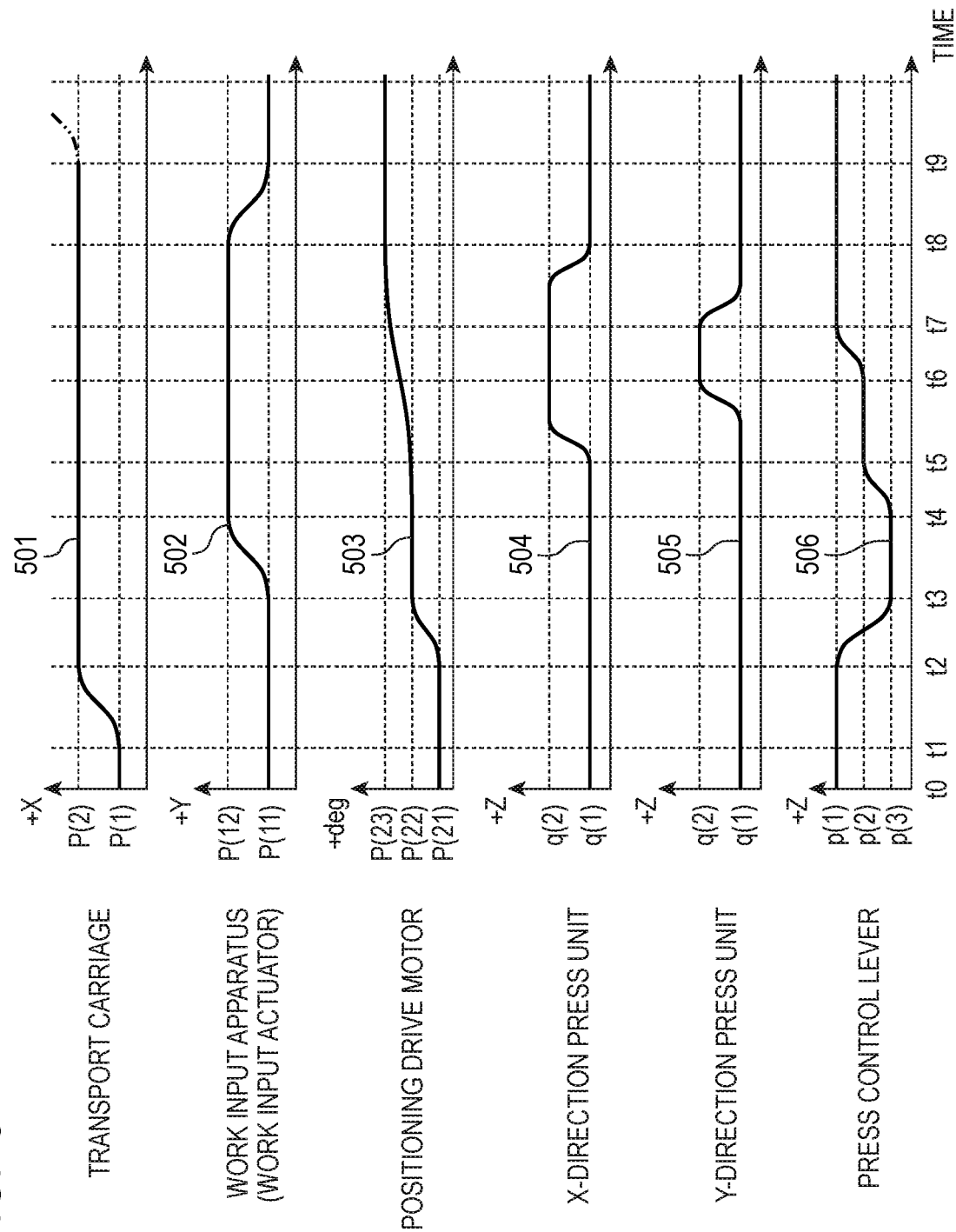
FIG. 8 is a diagram illustrating timing charts of operations of the transport carriage, a work input apparatus, a positioning drive motor, an X-direction press unit, a Y-direction press unit, and a press unit control lever according to the first embodiment of the present invention.

FIG. 8 is a diagram illustrating timing charts of operations of the transport carriage 10, the work input apparatus 5, the positioning drive motor 301, the X-direction press unit 112*a*, the Y-direction press unit 112*b*, and the press control lever 111 and illustrates timing charts 501 to 506. FIG. 9A to FIG. 9H are schematic diagrams illustrating the motion of the transport carriage 10, the work input apparatus 5, the work positioning mechanism 100, and the work positioning apparatus 110.

In FIG. 8, the timing chart 501 is a timing chart illustrating the motion of the transport carriage 10 and represents the state of the transport carriage 10 at each time. The timing chart 502 is a timing chart illustrating the motion of the work input apparatus 5 and represents the state of the work input apparatus 5 operated by the work input actuator 201 at each time. The timing chart 503 is a timing chart illustrating the motion of the positioning drive motor 301 and represents the state of the positioning drive motor 301 at each time. The timing chart 504 is a timing chart illustrating the motion of the X-direction press unit 112*a* and represents the state of the X-direction press unit 112*a* at each time. The timing chart 505 is a timing chart illustrating the motion of the Y-direction press unit 112*b* and represents the state of the Y-direction press unit 112*b* at each time. The timing chart 506 is a timing chart illustrating the motion of the press control lever 111 and represents the state of the press control lever 111 at each time.

Figure 9A:
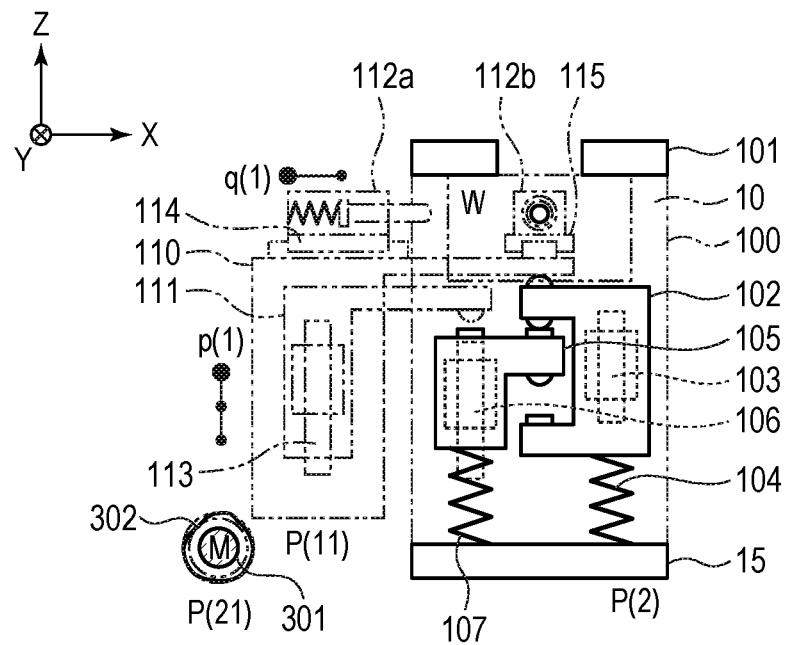
FIG. 9A is a schematic diagram illustrating operations of the transport carriage, the work input apparatus, a work positioning mechanism, and the work positioning apparatus according to the first embodiment of the present invention.

FIG. 9A illustrates the state of the transport carriage 10 and other apparatus from the time t0 to the time t2 illustrated in FIG. 8. FIG. 9B, FIG. 9C, FIG. 9D, FIG. 9E, and FIG. 9F illustrate the state of the transport carriage 10 and other apparatus at the time t3, the time t4, the time t5, the time t6, the time t7, the time t8, and the time t9, respectively.

First, during the time t1 to t2, the transport carriage 10 on which no work W is loaded moves from the teaching point P(1) that teaches the position of the transport carriage 10 on the carriage transfer apparatus 3 to the teaching point P(2) that teaches the position of the transport carriage 10 provided for the work input apparatus 5. FIG. 9A illustrates the state at the time t2.

Figure 9B:
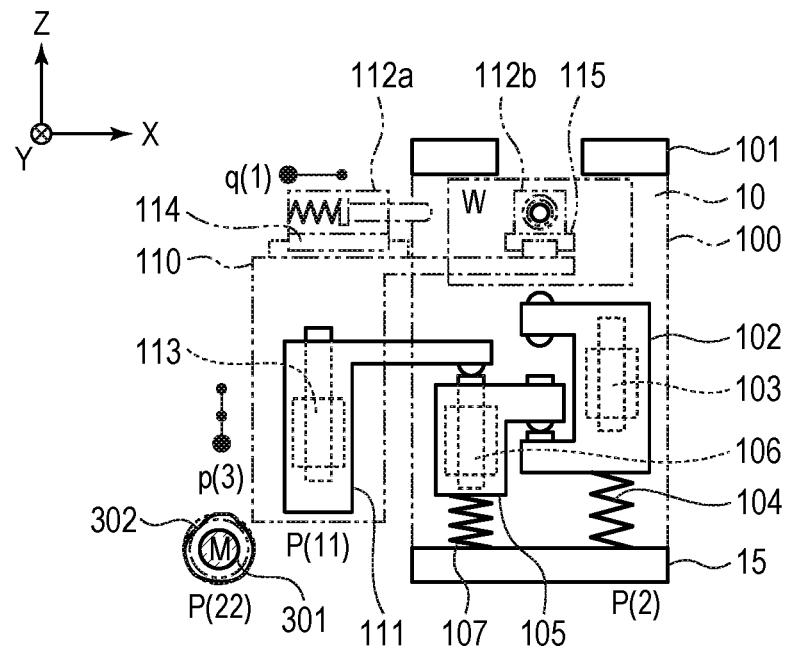
FIG. 9B is a schematic diagram illustrating operations of the transport carriage, the work input apparatus, the work positioning mechanism, and the work positioning apparatus according to the first embodiment of the present invention.

Subsequently, during the time t2 to t3, the positioning drive motor 301 moves from the teaching point P(21) that teaches standby of the positioning drive motor 301 to the teaching point P(22) that teaches release of the press control lever 111. Thereby, the press control lever 111 is released and moves to the lowermost position p(3) thereof. FIG. 9B illustrates the state at the time t3. At this time, the press control lever 111 engages with the fixing unit 105 and presses down the fixing unit 105 and the Z-direction press unit 102 with which the fixing unit 105 engages. Thereby, a predetermined clearance occurs between the contact reference 101 and the Z-direction press unit 102, and input of a work W is prepared.

Figure 9C:
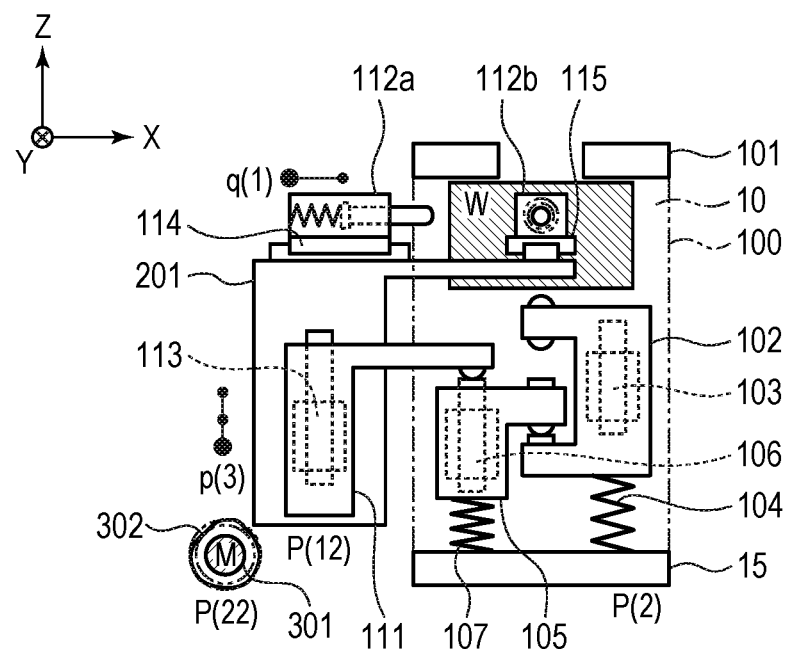
FIG. 9C is a schematic diagram illustrating operations of the transport carriage, the work input apparatus, the work positioning mechanism, and the work positioning apparatus according to the first embodiment of the present invention.

Subsequently, during the time t3 to t4, the work input actuator 201 moves from the teaching point P(11) that teaches input preparation of a work W to the teaching point P(12) that teaches input of the work W. Thereby, the work input apparatus 5 moves similarly. Subsequently, the work input apparatus 5 inputs and supplies the work W on the transport carriage 10. The work W is input between the contact reference 101 and the Z-direction press unit 102. FIG. 9C illustrates the state at the time t4.

Figure 9D:
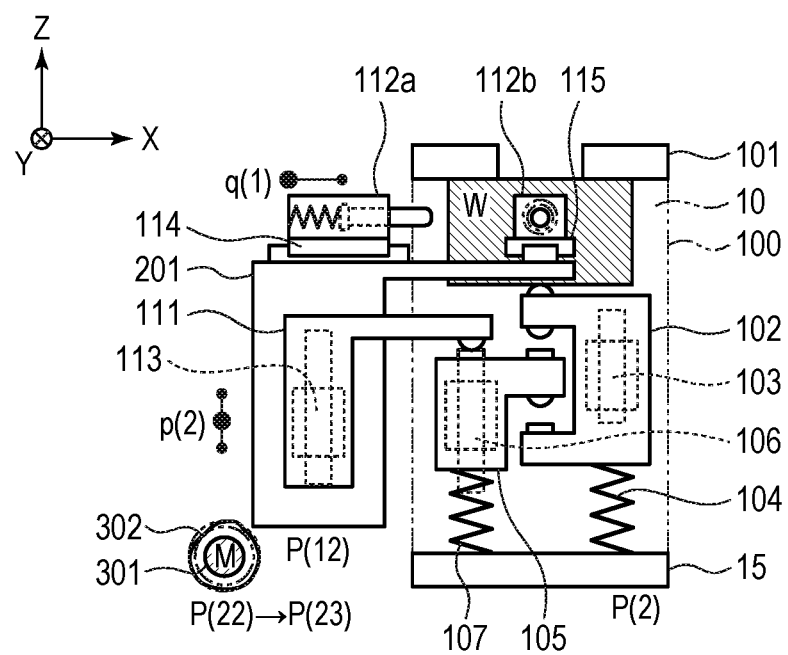
FIG. 9D is a schematic diagram illustrating operations of the transport carriage, the work input apparatus, the work positioning mechanism, and the work positioning apparatus according to the first embodiment of the present invention.

Subsequently, the positioning drive motor 301 starts moving to the teaching point P(23) that teaches the completion of driving of the positioning drive motor 301. In response, first, the drive cam 302 that drives the press control lever 111 causes the press control lever 111 to move to the position p(2). The time of this moment is the time t5, and FIG. 9D illustrates the state at the time t5. As illustrated in FIG. 9D, in a state where the press control lever 111 is positioned at the position p(2), only the Z-direction press unit 102 is in contact with the work W. The fixing unit 105 is latched by the press control lever 111 and thus is not in contact with the Z-direction press unit 102. Therefore, of the Z-direction press unit 102 and the fixing unit 105, only the Z-direction press unit 102 presses the work W in the +Z-direction against the contact reference 101. The fixing unit 105 is not in contact with the Z-direction press unit 102 and thus does not push the work W in the +Z-direction. The Z-direction press unit 102 presses the work W in the +Z-direction against the contact reference 101 accordingly, and thereby the work W on the transport carriage 10 is positioned in the Z-direction.

Figure 9E:
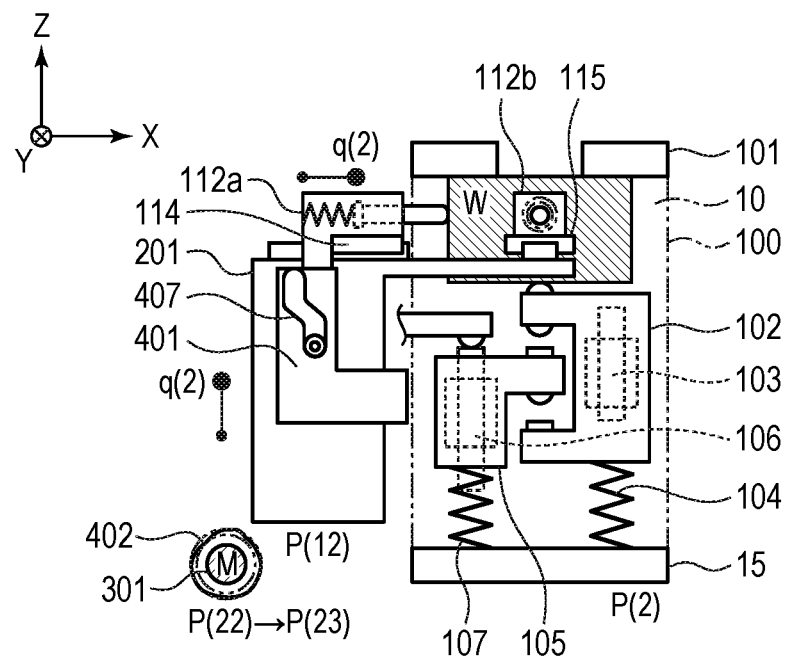
FIG. 9E is a schematic diagram illustrating operations of the transport carriage, the work input apparatus, the work positioning mechanism, and the work positioning apparatus according to the first embodiment of the present invention.

Subsequently, as the positioning drive motor 301 continues to move toward the teaching point P(23), the drive cam 402 causes the drive mechanism 401 to move from the position q(1) to the position q(2). The position q(1) is a position where the X-direction press unit 112a and the Y-direction press unit 112b stand by. The position q(2) is a position where positioning is performed by the X-direction press unit 112a and the Y-direction press unit 112b. Such motion of the drive mechanism 401 causes the X-direction press unit 112a to move in the +X-direction and the Y-direction press unit 112b to move in the +Y-direction. Thereby, each performs the press operation of the work W to position the work W. The X-direction press unit 112a presses the work W in the +X-direction against the contact reference 101 to perform positioning of the work W in the X-direction. Further, the Y-direction press unit 112b presses the work W in the +Y-direction against the contact reference 101 to perform positioning of the work W in the Y-direction. FIG. 9E illustrates the state at the time t6 in this press operation.

As described above, first, it is possible to stabilize the attitude of the work W by pressing the work W against the contact reference 101 to come into contact with the contact reference 101 by using the Z-direction press unit 102. Next, by positioning the work W by using the X-direction press unit 112a and the Y-direction press unit 112b, it is possible to stably press the work W against the contact reference 101 and come into contact with the contact reference 101 by using these press units 112a and 112b. Therefore, in the present embodiment, it is possible to perform accurate and stable positioning of the work W on the transport carriage 10.

In the pressing operation of the work W in the X-direction and the Y-direction, the X-direction press unit 112a may move first and the Y-direction press unit 112b may move next, as illustrated in the timing charts 504 and 505, for example. Further, the Y-direction press unit 112b may move first and the X-direction press unit 112a may then move. Further, the X-direction press unit 112a and the Y-direction press unit 112b may move simultaneously.

Figure 9F:
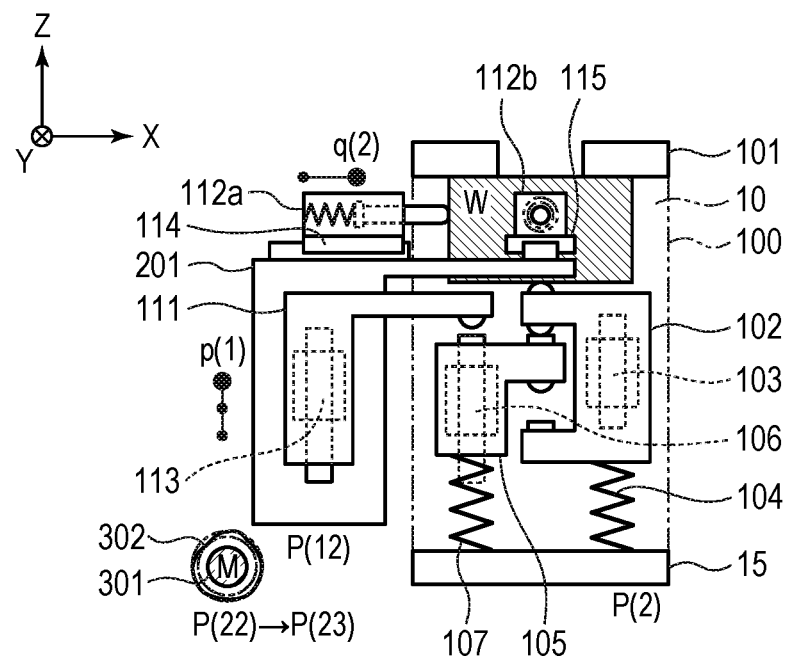
FIG. 9F is a schematic diagram illustrating operations of the transport carriage, the work input apparatus, the work positioning mechanism, and the work positioning apparatus according to the first embodiment of the present invention.

Subsequently, as the positioning drive motor 301 continues to move toward the teaching point P(23), the drive cam 302 causes the press control lever 111 to move to the position p(1) for standby at the time t7. In response, while coming into contact with the Z-direction press unit 102, the fixing unit 105 separates from the press control lever 111. The fixing unit 105 that has come into contact with the Z-direction press unit 102 presses the work W in the +Z-direction against the contact reference 101 via the Z-direction press unit 102. FIG. 9F illustrates the state at the time t7. Accordingly, the Z-direction press unit 102 and the fixing unit 105 press the work W against the contact reference 101 unit 102 using the pushing force of the springs 104 and 107, respectively, and thereby the work W is fixed on the transport carriage 10.

Accordingly, in the present embodiment, after positioning of the work W on the transport carriage 10, the work W that is in contact with the contact reference 101 is fixed by using the fixing unit 105. This allows the work W to be firmly fixed on the transport carriage 10 regardless of the pressing force of the X-direction press unit 112a and the Y-direction press unit 112b when positioning is performed. As a result, the position of the work W can be firmly fixed on the transport carriage 10 without any flaw occurring in the work W in positioning.

Further, even when the X-direction press unit 112a and the Y-direction press unit 112b withdraw as described below after the work W is fixed by the fixing unit 105, it is possible to maintain a state where the work W is in contact with the contact reference 101. Therefore, the X-direction press unit 112a and the Y-direction press unit 112b that are positioning units for positioning are not required to be loaded on the transport carriage 10, which allows a reduction in weight and a reduction in size of the transport carriage 10 to be realized.

Furthermore, the Z-direction press unit 102 and the fixing unit 105 on the transport carriage 10 is moved by the press control lever 111 provided outside the transport carriage 10. Therefore, since no actuator for moving these units is required to be provided on the transport carriage 10, there is no need for a cable or a pipe for transmission of motive power. As a result, the motion area of the transport carriage 10 is not limited, and the transport path of the transport carriage 10 can be provided with a high flexibility. For example, it is possible to form the circulation transport path as the transport path of the transport carriage 10.

As described above, in the present embodiment, positioning and fixing of a work W is performed on the transport carriage 10. At this time, the pressing operation of the work W is performed at the Z-direction press unit 102, the X-direction press unit 112a, the Y-direction press unit 112b, and the fixing unit 105 in this order, for example. In a pressing operation of a work W, the work W moves sliding on the contact reference 101 in a direction orthogonal to the direction in which pressing is completed. It is necessary to push the work W with force which overcomes the sliding frictional resistance at this time. It is therefore desirable for the force with which each of the press units 102, 112a, and 112b and the fixing unit 105 pushes a work W to have the following relationship. That is, when pressing is performed in the above order, such a relationship that the pressing force is in ascending order from the Z-direction press unit 102, the X-direction press unit 112a, the Y-direction press unit 112b, and the fixing unit 105.

Figure 9G:
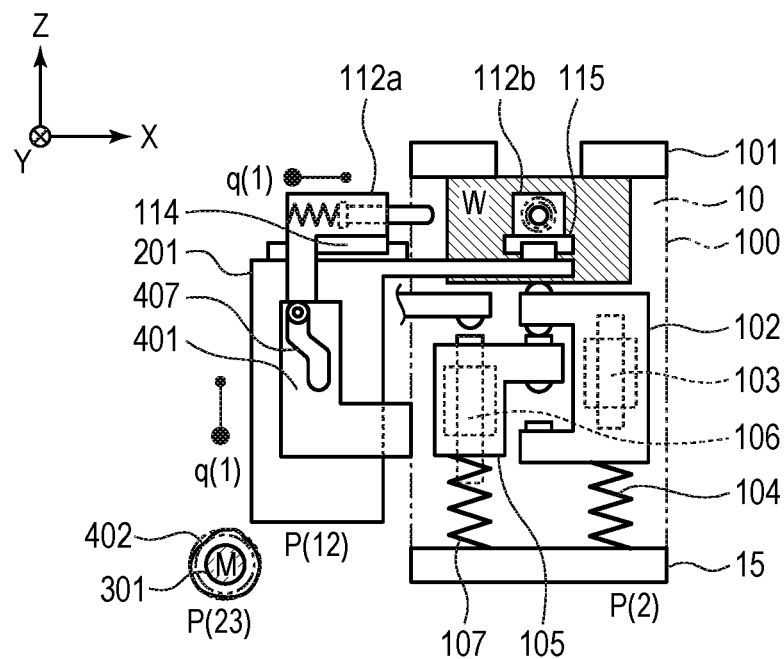
FIG. 9G is a schematic diagram illustrating operations of the transport carriage, the work input apparatus, the work positioning mechanism, and the work positioning apparatus according to the first embodiment of the present invention.

Subsequently, as the positioning drive motor 301 further continues to move toward the teaching point P(23), the drive cam 402 causes the drive mechanism 401 to again move to the position q(1) at the time t8. Thereby, the X-direction press unit 112a and the Y-direction press unit 112b are separated from the work W, respectively. FIG. 9G illustrates the state at the time t8. Further, at this point of time, the positioning drive motor 301 completes the motion to the teaching point P(23).

Figure 9H:
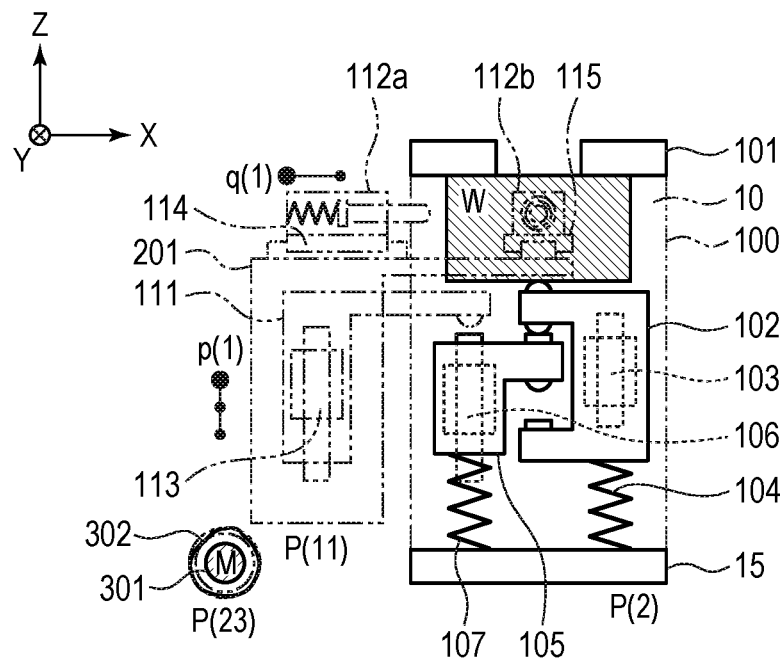
FIG. 9H is a schematic diagram illustrating operations of the transport carriage, the work input apparatus, the work positioning mechanism, and the work positioning apparatus according to the first embodiment of the present invention.

Subsequently, the work input actuator 201 again moves to the teaching point P(11), which enables the transport carriage 10 to move. FIG. 9H illustrates the state at the time t9 where the transport carriage 10 to which the work W is fixed is able to move. The transport carriage 10 is then transported on the transport apparatus forward path 1 to move to the processing apparatus 7.

In the processing apparatus 7, a working process such as assembly of components, application, or the like is performed on the transported work W. An article such as an electronic device is manufactured by performing the working process on the work W using the processing apparatus 7 accordingly. Note that the processing apparatus 7 that performs the working process is not limited to an apparatus that performs a particular working process, and any apparatus may be employed. Further, the article to be manufactured is not limited in particular, and any article may be manufactured. Various articles can be manufactured by the manufacturing method of an article using the processing system 00 according to the present embodiment.

As set forth, in the present embodiment, the Z-direction press unit 102 presses a work W in the +Z-direction against the contact reference 101 on the transport carriage 10 to perform positioning of the work W in the Z-direction. Further, the X-direction press unit 112a and the Y-direction press unit 112b press the work W in the +X-direction and the +Y-direction against the contact reference 101 on the transport carriage 10, respectively, to perform positioning of the work W in the X-direction and the Y-direction, respectively. Therefore, according to the present embodiment, accurate and stable positioning of a work W on the transport carriage 10 can be realized.

Further, in the present embodiment, the Z-direction press unit 102 that performs positioning of the work W in the Z-direction is provided on the transport carriage 10. On the other hand, the X-direction press unit 112a and the Y-direction press unit 112b that perform positioning of the work W in the X-direction and the Y-direction are provided outside the transport carriage 10. Further, the operations of the fixing unit 105 and the Z-direction press unit 102 are controlled by the press control lever 111 provided outside the transport carriage 10. Therefore, according to the present embodiment, a reduction in weight and the reduction in size of the transport carriage 10 can be realized.

Second Embodiment

Figure 10:
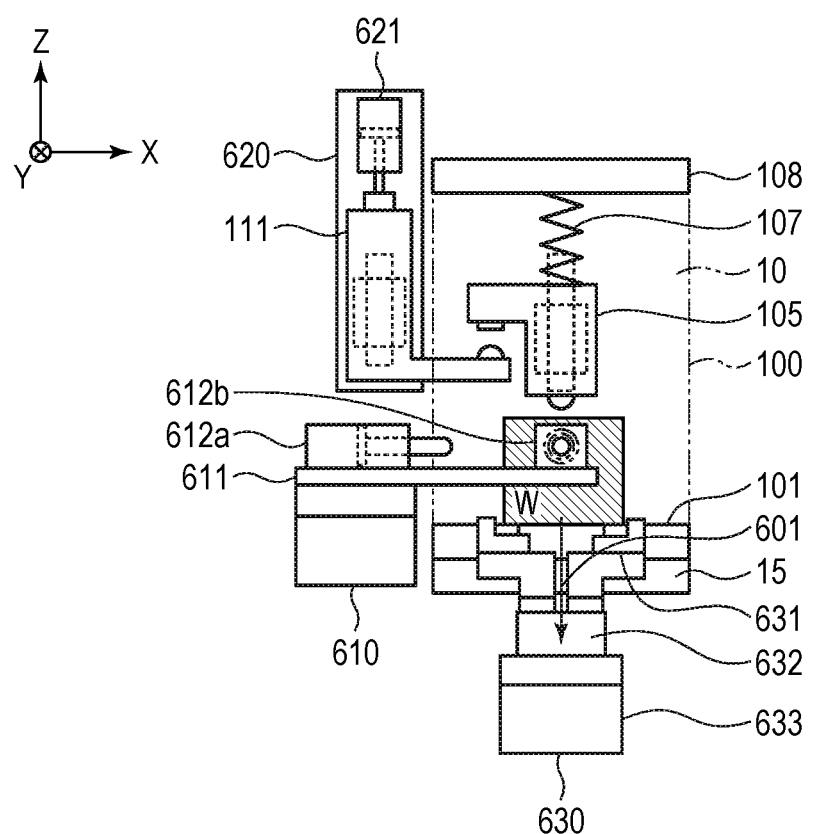
FIG. 10 is a schematic diagram illustrating a configuration of a transport carriage and a work positioning apparatus according to a second embodiment of the present invention.

A second embodiment of the present invention will be described by using FIG. 10. FIG. 10 is a schematic diagram illustrating the configuration of a transport carriage and a positioning apparatus according to the present embodiment. Note that similar components to those of the first embodiment described above are labeled with the same references and the description thereof will be omitted or simplified.

In the present embodiment, as illustrated in FIG. 10, the transport carriage 10, which is a carriage, has the top plate 15, the contact reference 101, the fixing unit 105, the spring 107 provided for the fixing unit 105, and a support member 108. Note that, in FIG. 10, the gravity 601 applied to the work W is schematically illustrated by an arrow.

In the present embodiment, unlike the first embodiment, the contact reference 101, which is a reference member for positioning the work W, is provided on the upper face of the top plate 15. The work W input on the transport carriage 10 is placed on the contact reference 101 to come into contact with the contact reference 101 by the gravity 601 in the −Z-direction.

The support member 108 is provided above the top plate 15 on which the contact reference 101 is provided. The fixing unit 105 is coupled to and suspended from the support member 108 via the spring 107. The fixing unit 105 is able to press the work W placed on the contact reference 101 in the −Z-direction against the contact reference 101 to be fixed.

Also in the processing system in the present embodiment, a work positioning apparatus 610, which is a positioning apparatus for positioning the work W on the transport carriage 10 in the X-direction and the Y-direction, is provided outside the transport carriage 10. However, the work positioning apparatus 610 is provided separately from a work input apparatus 630 in the downstream of the work input apparatus 630. Further, a press control apparatus 620 that controls the press control lever 111 is provided outside the transport carriage 10.

The work positioning apparatus 610 has a positioning apparatus actuator 611, an X-direction press cylinder 612a that is an X-direction press unit, and a Y-direction press cylinder 612b that is a Y-direction press unit. The X-direction press cylinder 612a and the Y-direction press cylinder 612b are provided on the positioning apparatus actuator 611.

The positioning apparatus actuator 611 is a position change unit that changes the position of the work positioning apparatus 610 including the X-direction press cylinder 612a and the Y-direction press cylinder 612b. The positioning apparatus actuator 611 moves the X-direction press cylinder 612a and the Y-direction press cylinder 612b from a standby position to a positioning position where positioning of the work W on the transport carriage 10 is performed. Further, the positioning apparatus actuator 611 moves the X-direction press cylinder 612a and the Y-direction press cylinder 612b from the positioning position to the standby position.

The X-direction press cylinder 612a and the Y-direction press cylinder 612b perform positioning operations of the work W placed on the contact reference 101 of the transport carriage 10 at respective positioning positions. The X-direction press cylinder 612a is configured to be able to come into contact with the work W on the contact reference 101 in the +X-direction and press the work W in the +X-direction against the contact reference 101. By pressing the work W in the +X-direction against the contact reference 101 accordingly, the X-direction press cylinder 612a positions the work W in the X-direction. The Y-direction press cylinder 612b is configured to be able to come into contact with the work W on the contact reference 101 in the +Y-direction and press the work W in the +Y-direction against the contact reference 101. By pressing the work W in the +Y-direction against the contact reference 101 accordingly, the Y-direction press cylinder 612b positions the work W in the Y-direction.

The press control apparatus 620 has the press control lever 111 and a drive actuator 621 that operates the press control lever 111. The press control lever 111 is movable in the Z-direction by using the drive actuator 621.

The work input apparatus 630 has work grip claws 631, a work grip hand 632, and an input apparatus actuator 633. The work grip claws 631 and the work grip hand 632 are provided on the input apparatus actuator 633.

In the first embodiment, the work input apparatus 5 and the work positioning apparatus 110 are moved by using the work input actuator 201. In contrast, in the present embodiment, the positioning apparatus actuator 611 and the input apparatus actuator 633 are provided independently of each other. This feature makes the present embodiment different from the first embodiment.

Further, in the first embodiment, the press control lever 111, the X-direction press unit 112a, and the Y-direction press unit 112b are operated by the positioning drive motor 301. In contrast, in the present embodiment, the press control lever 111 is operated by the drive actuator 621. Further, in the present embodiment, pressing operations of the work W in the X-direction and the Y-direction are performed by using the X-direction press cylinder 612a and the Y-direction press cylinder 612b, respectively. The present embodiment is different from the first embodiment in these points.

In the present embodiment, when a work W is input, the press control lever 111 moves in the +Z-direction. This causes the press control lever 111 to come into contact with the fixing unit 105 and engage with the fixing unit 105 pushed in the +Z-direction by the spring 107. The press control lever 111 then pushes up the fixing unit 105 in the +Z-direction against the pushing force of the spring 107. Thereby, a clearance through which a work W is input occurs between the contact reference 101 and the fixing unit 105 on the transport carriage 10.

Subsequently, the work W gripped by the work grip claws 631 is supplied on the transport carriage 10 by the work grip hand 632. Subsequently, in response to the work grip hand 632 releasing the work W gripped by the work grip claws 631, the work W is subjected to the influence of the gravity 601 in the −Z-direction, moves in the −Z-direction, and comes into contact with the contact reference 101. Thereby, the work W is positioned in the Z-direction.

The work W positioned in the Z-direction on the transport carriage 10 as illustrated above is fixed on the transport carriage 10 by the fixing unit 105. When the work W is fixed, the press control lever 111 moves in the −Z-direction, and thereby the press control lever 111 is separated from the fixing unit 105. In response, the fixing unit 105 pushed by the spring 107 comes into contact with the work W. Accordingly, the work W is fixed by the fixing unit 105. In a state where the work W is fixed accordingly, the transport carriage 10 is transported to a position where positioning of the work W in the X-direction and the Y-direction is performed or the like.

The work W caused to come into contact with the contact reference 101 by the gravity 601 and fixed by the fixing unit 105 as described above is released from fixation by the fixing unit 105 and then positioned in the X-direction and the Y-direction. When the fixation by the fixing unit 105 is released, the press control lever 111 moves in the +Z-direction. This causes the press control lever 111 to come into contact with the fixing unit 105 and engage with the fixing unit 105 pushed in the +Z-direction by the spring 107. The press control lever 111 then pushes up the fixing unit 105 in the +Z-direction against the pushing force by the spring 107. Thereby, the fixing unit 105 is separated from the work W, and a clearance occurs between the fixing unit 105 and the work W.

The work W released from fixation of the fixing unit 105 is pressed in the +X-direction against the contact reference 101 by the X-direction press cylinder 612a and positioned in the X-direction. Further, the work W is pressed in the +Y-direction against the contact reference 101 by the Y-direction press cylinder 612b and positioned in the Y-direction. Note that any of the positioning in the X-direction by using the X-direction press cylinder 612a and the positioning in the Y-direction by using the Y-direction press cylinder 612b may be performed first, or both of them may be performed simultaneously.

Subsequently, the press control lever 111 moves in the −Z-direction, and thereby the press control lever 111 separates from the fixing unit 105. In response, the fixing unit 105 pushed by the spring 107 comes into contact with the work W. Accordingly, the work W is fixed by the fixing unit 105.

As illustrated in the present embodiment, it is possible to perform positioning in the Z-direction of the work W on the transport carriage 10 by utilizing the gravity 601 without providing the Z-direction press unit 102.

Third Embodiment

Figure 11:
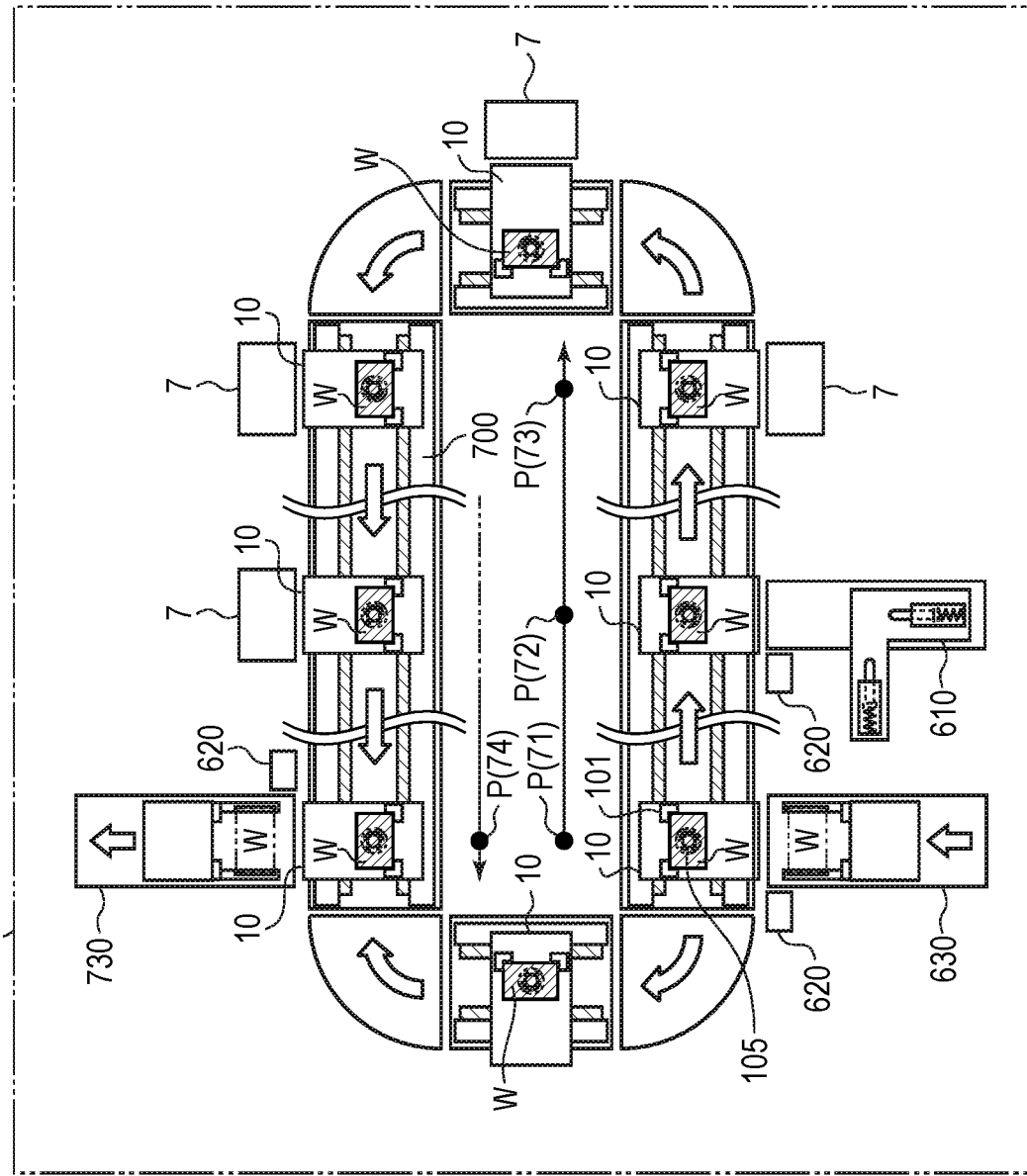
FIG. 11 is a schematic diagram illustrating the entire configuration of a processing system according to a third embodiment of the present invention.

A third embodiment of the present invention will be described by using FIG. 11. FIG. 11 is a schematic diagram illustrating the entire configuration of a processing system according to the present embodiment. Note that similar components to those of the first and second embodiments described above are labeled with the same references and the description thereof will be omitted or simplified.

As illustrated in FIG. 11, a processing system 03 according to the present embodiment has the transport carriages 10, the work positioning apparatus 610, the press control apparatuses 620, the work input apparatus 630, a circulation transport apparatus 700, and a work output apparatus 730. The press control apparatus 620 is installed to each of the work input apparatus 630, the work positioning apparatus 610, and the work output apparatus 730.

The circulation transport apparatus 700 is a transport apparatus that transports the transport carriage 10, which is a carriage, and the circulation transport apparatus 700 has an oval shaped transport path and is configured to enable circulation motion of the transport carriage 10.

The transport carriage 10, the work positioning apparatus 610, the press control apparatus 620, and the work input apparatus 630 have the same configurations as those described in the second embodiment. The work input apparatus 630, the work positioning apparatus 610, a plurality of processing apparatuses 7, and the work output apparatus 730 are arranged in the circulation direction in this order along the oval shaped transport path of the circulation transport apparatus 700. The press control apparatus 620 is arranged to each of the work input apparatus 630, the work positioning apparatus 610, and the work output apparatus 730.

In FIG. 11, teaching points P(71), P(72), P(73), and P(74) illustrated in this order in the circulation direction of the transport path in the circulation transport apparatus 700 are teaching points that indicate positions of the transport carriage 10, respectively. The teaching point P(71) is a teaching point that teaches a position of the transport carriage 10 provided for the work input apparatus 630. The teaching point P(72) is a teaching point that teaches a position of the transport carriage 10 provided for the work positioning apparatus 610. The teaching point P(73) is a teaching point that teaches a position of the transport carriage 10 provided for the processing apparatus 7. The teaching point P(74) is a teaching point that teaches a position of the transport carriage 10 provided for the work output apparatus 730.

First, in response to the transport carriage 10 moving to the teaching point P(71), the work W is supplied between the contact reference 101 and the fixing unit 105 on the transport carriage 10 by the press control apparatus 620 and the work input apparatus 630. The work W supplied on the transport carriage 10 is caused to come into contact with the contact reference 101 by the gravity 601 in the Z-direction and then fixed on the transport carriage 10 by the fixing unit 105. At this time, since the work W is not in contact with the contact reference 101 in the X-direction and the Y-direction, there is a clearance between the work W and the contact reference 101. That is, while the work W is positioned in the Z-direction, the work W has not yet been positioned in the X-direction and the Y-direction.

Subsequently, the transport carriage 10 moves to the teaching point P(72). In response, the fixation of the work W by the fixing unit 105 is released by the press control apparatus 620, and a clearance occurs between the fixing unit 105 and the work W.

Subsequently, the work W is caused to come into contact with the contact reference 101 in the X-direction and the Y-direction by the work positioning apparatus 610 to perform positioning of the work W in the X-direction and the Y-direction. Then, the work W is fixed on the transport carriage 10 by the fixing unit 105.

Subsequently, the transport carriage 10 moves to the teaching point P(73). In response, the processing apparatuses 7 apply a predetermined processing operation to the work W fixed on the transport carriage 10. Then, the transport carriage 10 moves to the teaching point P(74) after the predetermined processing operation to the work W by the plurality of processing apparatuses 7. In response, the fixation of the work W is released by the fixing unit 105 is released by the press control apparatus 620. Subsequently, the work output apparatus 730 picks out the work W from the transport carriage 10.

As illustrated in the present embodiment, a transport path that enables circulation motion of the transport carriage 10 can be configured. Note that, while the case with the configuration of the transport carriage 10 and the work positioning apparatus 610 according to the second embodiment has been described above, the embodiment is not limited thereto. Even in a case with the transport carriage 10 and the work positioning apparatus 110 according to the first embodiment, a transport path that enables circulation motion of the transport carriage 10 can be configured.

Further, the case where the work positioning apparatus 610 is provided separately from the work input apparatus 630 has been described above, the embodiment is not limited thereto. The work positioning apparatus 610 may be provided to the work input apparatus 630.

Modified Embodiments

The present invention is not limited to the above-described embodiment, and various modifications are possible.

For example, while the case where a transport system using an MM-type linear motor is used as a transport system of the transport carriage 10 that is a carriage has been described in the above embodiments, the invention is not limited thereto. As a transport system of the transport carriage 10, an index system, an intermittent feed transport system using a single-axis robot, or the like may be used.

Further, while the case where the X-direction press unit 112a and the Y-direction press unit 112b are of a spring press system has been described in the above embodiments, the invention is not limited thereto. The case where the X-direction press unit 112a and the Y-direction press unit 112b may be of an air pressure cylinder system, an oil pressure cylinder system, a press control system using a single-axis robot, or the like other than the spring pressing system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-099818, filed on May 19, 2017, which is hereby incorporated by reference herein in its entirety.

What is claimed is:

1. A transport system comprising:
    a carriage having a first face, the carriage being supplied with a workpiece at a side of the first face, the carriage including a reference member with which the workpiece is contacted and a fixing unit that fixes the workpiece at the side of the first face, the workpiece being positioned in two or more directions with respect to the reference member;
    a transport path that transports the carriage; and
    a positioning apparatus that positions the workpiece on the carriage, the positioning apparatus including a first positioning unit,
    wherein, in a state where the workpiece is positioned at the side of the first face in a first direction and is not fixed by the fixing unit, the first positioning unit presses the workpiece in a second direction to make the workpiece come into contact with the reference member and position the workpiece at the side of the first face in the second direction, the second direction intersecting the first direction.

2. The transport system according to claim 1, further comprising a control unit that is provided outside the carriage and controls motion of the fixing unit.

3. The transport system according to claim 2 further comprising a workpiece supply apparatus that supplies the workpiece on the carriage, the workpiece supply apparatus being arranged along a transport direction of the carriage,
    wherein the positioning apparatus and the control unit are provided on the workpiece supply apparatus.

4. The transport system according to claim 1,
    wherein the carriage has another positioning unit,
    wherein the another positioning unit presses the work against the reference member in the first direction to position the work in the first direction on the carriage, and
    wherein the control unit controls motion of the another positioning unit.

5. The transport system according to claim 4,
    wherein the fixing unit presses the work against the reference member to fix the work, and
    wherein force with which the fixing unit presses the work against the reference member is greater than force with which the another positioning unit presses the work against the reference member.

6. The transport system according to claim 4, wherein each of the another positioning unit and the fixing unit presses the work against the reference member by using a spring.

7. The transport system according to claim 4, wherein the another positioning unit presses the work against the reference member perpendicularly upward.

8. The transport system according to claim 4, wherein, when the work is not on the carriage, a gap between the another positioning unit and the reference member is smaller than a size of the work.

9. The transport system according to claim 1,
    wherein the carriage has a magnet, and
    wherein the transport path has a group of coils that generate electromagnetic force between the magnet and the group of coils to move the carriage.

10. A carriage having a first face, being supplied with a workpiece at a side of the first face, and being transported on a transport path, the carriage comprising:
- a reference member with which the workpiece is contacted; and
- a fixing unit that fixes the workpiece at the side of the first face, the workpiece being positioned in two or more directions with respect to the reference member,
- wherein, in a state where the workpiece is positioned at the side of the first face in a first direction and is not fixed by the fixing unit, the workpiece is pressed by a first positioning unit in a second direction to come into contact with the reference member and be positioned at the side of the first face in the second direction, the second direction intersecting with the first direction.

11. The carriage according to claim 10, further comprising a third positioning unit, the third positioning unit presses the workpiece in the first direction to make the workpiece come into contact with the reference member and position the workpiece at the side of the first face in the first direction,
- wherein the first direction is a direction perpendicular to the second direction.

12. The carriage according to claim 11,
- wherein the fixing unit moves interlocking with the third positioning unit.

13. The carriage according to claim 11, wherein each of the another positioning unit and the fixing unit presses the work against the reference member by using a spring.

14. The carriage according to claim 11, wherein the another positioning unit presses the work against the reference member perpendicularly upward.

15. The carriage according to claim 11, wherein, when the workpiece is not on the carriage, a gap between the third positioning unit and the reference member is smaller than a size of the workpiece.

16. A positioning apparatus used in a transport system, the transport system including a carriage having a first face and a transport path that transports the carriage, the carriage having a reference member with which a workpiece is contacted and a fixing unit that fixes the workpiece at a side of the first face, the workpiece being positioned in two or more directions with respect to the reference member, the positioning apparatus comprising:
- a first positioning unit that presses the workpiece, in a state where the workpiece is positioned at the side of the first face in a first direction and is not fixed by the fixing unit, the first positioning unit pressing the workpiece in a second direction to make the workpiece come into contact with the reference member and position the workpiece at the side of the first face in the second direction, the second direction intersecting with the first direction; and
- a drive unit that drives the first positioning unit.

17. The positioning apparatus according to claim 16, wherein the first-positioning unit and the drive unit are provided outside the carriage.

18. A processing system comprising:
- the transport system according to claim 1; and
- a processing apparatus that applies a processing operation to the workpiece fixed on the carriage by the fixing unit.

* * * * *

UNITED STATES PATENT AND TRADEMARK OFFICE
CERTIFICATE OF CORRECTION

PATENT NO. : 10,951,092 B2
APPLICATION NO. : 15/982386
DATED : March 16, 2021
INVENTOR(S) : Okazaki et al.

Page 1 of 2

It is certified that error appears in the above-identified patent and that said Letters Patent is hereby corrected as shown below:

In the Specification

Change all whole-word occurrences of "work" to -- workpiece -- commencing with a first occurrence at Column 1, Line 10, through to a final occurrence at Column 23, Line 43 (419 occurrences).

Change all whole-word occurrences of "works" to -- workpieces -- commencing with a first occurrence at Column 1, Line 21, through to a final occurrence at Column 5, Line 1 (4 occurrences).

Column 1:
Line 16, change "device of a" to -- device for a --.
Lines 43-44, change "concern of a flaw" to -- concern of creating a flaw --.
Lines 44-45, change "caused by multiple times of repetition of" to -- caused by repetitive --.
Line 65, change "discloses an art" to -- discloses a technique --.

Column 2:
Line 3, change "discloses an art" to -- discloses a technique --.
Line 6, change "the art" to -- the technique --.
Line 8, change "the art" to -- the technique --.
Line 12, change "the art" to -- the technique --.
Line 33, change "including: a carriage" to -- including a carriage --.
Line 34, change "supplied; a transport" to -- supplied, a transport --.
Lines 34-35, change "carriage; and" to -- carriage, and --.
Line 49, change "includes: a reference" to -- includes a reference --.
Line 51, change ";" to -- , --.
Line 67, change "includes: a positioning" to -- includes a positioning --.

Column 3:
Line 9, change "above; and" to -- above, and --.

Signed and Sealed this
Sixth Day of June, 2023

Katherine Kelly Vidal
*Director of the United States Patent and Trademark Office*

Column 7:
Line 29, change "Won" to -- W on --.

Column 11:
Line 24, change "Win" to -- W in --.

Column 12:
Line 16, change "Win" to -- W in --.
Line 17, change "Win" to -- W in --.
Line 19, change "Win" to -- W in --.
Line 46, change "Win" to -- W in --.

Column 13:
Line 42, change "Won" to -- W on --.

Column 17:
Line 16, change "Win" to -- W in --.
Line 19, change "Win" to -- W in --.
Line 36, change "Win" to -- W in --.

Column 19:
Line 26, change "Win" to -- W in --.
Line 31, change "Won" to -- W on --.

Column 20:
Line 41, change "Won" to -- W on --.

Column 21:
Line 41, change "Win" to -- W in --.

Column 23:
Line 14, change "Win" to -- W in --.